(12) United States Patent
Chan

(10) Patent No.: US 8,256,554 B2
(45) Date of Patent: Sep. 4, 2012

(54) PEDAL DRIVEN APPARATUS HAVING A MOTOR

(75) Inventor: Yet Chan, Kowloon (HK)

(73) Assignee: Foster Assets Corporation, Kwun Tong (HK)

( * ) Notice: Subject to any disclaimer, the term of this patent is extended or adjusted under 35 U.S.C. 154(b) by 0 days.

(21) Appl. No.: 12/977,824

(22) Filed: Dec. 23, 2010

(65) Prior Publication Data

US 2011/0183793 A1 Jul. 28, 2011

(51) Int. Cl.
*B62M 6/55* (2010.01)
(52) U.S. Cl. ..................................... 180/206.4
(58) Field of Classification Search .... 180/206.1–206.4, 180/205.4
See application file for complete search history.

(56) References Cited

U.S. PATENT DOCUMENTS

| | | | | |
|---|---|---|---|---|
| 3,884,317 | A * | 5/1975 | Kinzel | 180/220 |
| 4,393,954 | A * | 7/1983 | Soucy et al. | 180/205.3 |
| 6,012,538 | A * | 1/2000 | Sonobe et al. | 180/220 |
| 6,196,347 | B1 * | 3/2001 | Chao et al. | 180/206.2 |
| 2011/0172050 | A1 * | 7/2011 | Nichols et al. | 475/183 |

* cited by examiner

*Primary Examiner* — Tony Winner
(74) *Attorney, Agent, or Firm* — Renner Kenner Greive Bobak Taylor & Weber

(57) ABSTRACT

A hybrid bicycle includes a control system for providing a control input for a motor component or a gearing adjustment mechanism of the bicycle. The motor component, if employed, assists in forward propulsion of the bicycle and the control system, when providing a control input for the motor increases drive power applied by the motor to the bicycle. The gearing adjustment mechanism, if employed, effects a change in a gearing ratio applied to a wheel of the bicycle, and the control system, when providing a control input for the gearing adjustment mechanism continuously varies the gearing ratio.

22 Claims, 29 Drawing Sheets

B—B

C-C

C-C

SEC B-B

PEDAL DRIVEN APPARATUS HAVING A MOTOR

FIELD OF THE INVENTION

The invention relates to a pedal driven apparatus which can be manually propelled, but which includes a motor unit for also causing forward propulsion of the apparatus. The invention relates particularly, but not exclusively, to pedal driven wheeled apparatuses or vehicles such as bicycles having an electric motor powered by a battery pack carried on the vehicle.

BACKGROUND OF THE INVENTION

It is known to provide some manually propellable wheeled vehicles or apparatuses such as bicycles with a motor unit to assist a user in powering the apparatus, especially up sloping terrain, e.g. hills, although the motor unit is sometimes used by itself to power the bicycle over any terrain. Often, a power level adjuster, commonly referred to as a throttle, but maybe comprising a torque sensor, together with a power switch, where applicable, for the motor unit are located on a handlebar of the bicycle near to other controls such as gear change levers and handbrake levers. A problem with this arrangement is that the presence of the conventional control devices such as gear change levers and handbrake levers at positions convenient for a user to operate by hand often necessitates the motor unit power level adjuster being located at a position on the bicycle that is not convenient for easy hand operation and may even require the user to remove one of their hands from the handlebar in order to operate said power level adjuster which is not desirable.

A further problem with conventional hybrid bicycles having a motor unit is that the positioning of the motor power level adjuster for hand operation often results in less than smooth adjustment of the level of power, e.g. electric current for an electric motor, being provided to the motor unit. One reason for this is that, where the power level adjuster is operated by hand with the hand still in contact with the handlebar, shocks incident on the wheels of the bicycle are felt more substantially in the user's arms than in their legs. The problem of smooth adjustment is exacerbated where the user is forced to remove one of their hands from the handlebar to operate the power level adjuster as the user now has to control steering and braking of the bicycle using one hand which is further problematic in that it distracts the user from the task in hand, namely to adjust the level of power being provided to the motor unit.

The foregoing problems are also true to some degree with respect to operating a gear change lever or the like on the bicycle, particularly where the gear change lever is not readily accessible on the handlebar of the bicycle.

The foregoing are just some of the common problems encountered with conventional hybrid motor assisted pedal driven apparatuses such as bikes.

SUMMARY OF THE INVENTION

An object of the invention is to provide a smoother control of power level adjustment to a power unit on a hybrid bicycle or a smoother gearing change on a bicycle.

Another object of the invention is to provide an improved pedal driven apparatus having a motor unit.

Another object of the invention is to mitigate or obviate to some degree one or more problems associated with known hybrid bicycles or pedal driven apparatuses.

One skilled in the art will derive from the following description other objects of the invention. Therefore, the foregoing statements of object are not exhaustive and serve merely to illustrate some of the many objects of the present invention.

In a first main aspect of the invention, there is provided a pedal driven apparatus comprising: a first member mounted for rotation about an axis of rotation of a pedal spindle; a drive sprocket mounted for rotation about said axis of rotation of a pedal spindle; means for detecting movement of said first member relative to said drive sprocket in a rotational direction of said drive sprocket about said pedal spindle axis of rotation; and means for converting said detected movement to a control input for another component on said pedal driven apparatus. The pedal driven apparatus may comprise a bicycle, although the invention is applicable to other pedal driven apparatuses such as pedalos, for example. The control input may comprise any of an electrical control input, an electronic control input or a mechanical control input It will be understood that the term "drive sprocket" is to be taken to mean any rotational component capable of transferring a driving force to another rotational component and includes, but is not limited to, toothed sprockets for engaging drive chains, belt pulleys for engaging drive belts, or gear wheels for engaging other gear wheels or gear trains.

Preferably, the means for detecting movement comprises a mechanism associated with a drive sprocket assembly of said pedal driven apparatus. It may be configured to translate a detected rotational movement into an axial movement. More preferably, the first member is mounted for fixed rotation with the pedal spindle of said pedal driven apparatus and the drive sprocket is mounted on a second member which is mounted for rotation about the pedal spindle axis of rotation, but is not fixed for rotation with the pedal spindle and which is coupled to the first member and moveable by a limited amount relative to the first member between a first position and a second position.

Relative movement between the first and second members is effected by a user applying pressure upon at least the forward-most pedal as viewed in a forward motion direction of the bicycle, although the arrangement may be such that pressure on the rearward pedal is accepted as an input to generate a control input for the other component. Where this component comprises a motor, the pressure on the pedal may increase drive power from the motor. Consequently, as will be described below, control of a power level being provided to the motor unit is effected manually through the user's (cyclist's) legs rather than by hand which reduces many of the aforesaid problems.

The second member may be coupled to the first member such that a manual driving force applied to pedals of the pedal driven apparatus is transferred by said first member to said second member. At least one biasing element may bias said second member in its first position with respect to the first member when no manual pressure is being applied to at least a forward one of the pedals. A driving force applied to the first member may be transferred to said second member via said at least one biasing element.

Preferably, a plurality of biasing elements biases said second member in its first position with respect to the first member when no manual pressure is being applied to at least a forward one of the pedals, and wherein at least one of said biasing elements is configured to be engaged prior to others of said biasing elements when manual pressure is applied to a forward one of said pedals whereby said at least one of said biasing elements controls movement of the first member with respect to the second member for a first portion of possible travel of said first member with respect to the second member. The plurality of biasing elements may comprise a first set of biasing elements and a second set of biasing elements and wherein said first set of biasing elements are configured to be engaged prior to the second set of biasing elements when manual pressure is applied to a forward one of said pedals whereby said first set of biasing elements controls movement of the first member with respect to the second member for a first portion of possible travel of said first member with respect to the second member.

Preferably, the means for detecting movement comprises at least one lever member pivotally mounted on the second member so as to pivot about an axis that is perpendicular to the pedal spindle axis of rotation and which comprises a first end which engages a surface of the first member such that when the first member moves relative to the second member it causes the at least one lever member to pivot about its pivot axis whereby a second end of said lever member extends outwardly from the second member in a direction parallel to the pedal spindle axis of rotation to engage an actuator member and cause said actuator member to move in an axial direction perpendicular to said rotational directional.

The means for converting said detected movement may be configured to receive movement of an actuator member in an axial direction perpendicular to said rotational directional of the sprocket and may comprise a rack and pinion assembly whereby the rack is biased to press against the actuator member such that movement of the actuator member in said axial direction causes movement of said rack and thus rotation of the pinion. However, any suitable means of receiving a movement of an actuator member and converting said received movement into a signal (electrical and/or electromagnetic) proportional to the size of the received movement may be used in accordance with the invention.

Preferably, the rack and pinion assembly has a sensor associated therewith which senses rotation of the pinion and outputs a signal indicative of an amount by which the pinion has been caused to rotate by the actuator member acting on the rack. The amount by which the pinion rotates is directly proportional to the amount of relative movement between the first member and the second member/drive sprocket and thus is indicative of the amount by which a user wishes to adjust the size of the control input, e.g. the amount by which the uses wishes to adjust a power level being provided to the motor unit. The use of a rack and pinion is useful in that it enables a linear input from the actuator member to be translated into a rotational output which makes the resulting device compact in size.

The means for converting said detected movement may comprise a contactless means whereby movement of the actuator member in said axial direction causes movement of a magnetized element relative to a sensor. The magnetized element may be carried on said actuator member with the sensor being carried on a collar having a fixed axial position with respect to the spindle. The magnetized element may comprise a ring shaped element or it may comprise a plurality of separate, but spaced apart magnetic elements.

Preferably, the another component comprises a motor mounted on said pedal driven apparatus and wherein said pedal driven apparatus includes a controller for receiving a control input from said converting means for increasing an amount of driving force applied by said motor to said pedal driven apparatus to propel said pedal driven apparatus.

The motor may be configured to apply a driving force to a part of the bicycle selected from the group comprising: the pedal spindle, a rim or tyre of a wheel, an axel or drive sprocket of a wheel. The invention is applicable to any type of motor unit such as electric motors or even internal combustion engines and to any positioning of the motor on the bicycles as mentioned above. The motor may be configured to apply a driving force to a part of the bicycle selected from the group comprising: the pedal spindle, a rim or tyre of a wheel, an axel or drive sprocket of a wheel. The motor may be an electric motor powered by a battery pack carried on the pedal driven apparatus.

Preferably, associated with the motor unit is circuitry for receiving a control input signal indicative of an amount by which the first member has moved relative to the drive sprocket, said circuitry being arranged to control said motor to increase the driving force of said motor in response to the input control signal. The circuitry may be contained within the motor unit housing or in a control box for the motor unit.

Alternatively or additionally, the another component comprises a gearing adjustment means for said pedal driven apparatus and wherein said gearing adjustment means is configured to receive a control input from said converting means for causing said gearing adjustment means to effect a gearing change for the pedal driven apparatus.

The gearing adjustment means may be associated with a rear wheel of the bicycle and is configured to receive the control input from the converting means to thereby effect a change in a gearing ratio applied to the rear wheel. The gearing adjustment means may comprise a continuous variable transmission (CVT) system having a continuously variable gearing ratio, said CVT system being configured to receive said input control signal and adjust the gearing ratio by an amount proportional to the movement detected by the movement detecting means. The CVT system may be configured to continuously vary the gearing ratio in response to said input control signal.

Preferably, the CVT system has a servo-motor associated therewith which is configured to receive said input control signal whereby operation of the servo-motor in response to the input control signal effects a continuously variable change in the gearing ratio through movement of a control pin of the CVT system.

In a second main aspect of the invention, there is provided a control system for generating a control input for a component on a pedal driven apparatus, said control system comprising: a first member mounted for rotation about an axis of rotation of a pedal spindle; means for detecting movement of said first member relative to a drive sprocket in a rotational direction of said drive sprocket about said pedal spindle axis of rotation; and means for converting said detected movement to a control input for said another component on said pedal driven apparatus.

In a third main aspect of the invention, there is provided a drive sprocket assembly for a pedal driven apparatus, said drive sprocket assembly comprising: a first member rotatable about an axis of rotation of a pedal spindle; a drive sprocket rotatable about said axis of rotation of a pedal spindle, said drive sprocket being loosely coupled to said first member and moveable by a limited amount relative thereto in a rotational direction of said drive sprocket; and a mechanism for detecting movement of said first member relative to said drive sprocket in said rotational direction of said drive sprocket.

Preferably, said first member is fixedly rotatable with the pedal spindle and the drive sprocket is mounted on a second member which is not fixedly rotatable with the pedal spindle, but is moveable by a limited amount relative to the first member between a first position and a second position.

Preferably, the second member is coupled to the first member such that a manual driving force applied to pedals of the pedal driven apparatus is transferred by said first member to said second member.

Preferably, at least one biasing element biases said second member in its first position with respect to the first member when no manual pressure is being applied to at least a forward one of the pedals.

Preferably, a driving force applied to the first member is transferred to said second member via said at least one biasing element.

Preferably, means for detecting movement comprises at least one lever member pivotally mounted on the second member so as to pivot about an axis that is perpendicular to the pedal spindle axis of rotation and which comprises a first end which engages a surface of the first member such that when the first member moves relative to the second member it causes the at least one lever member to pivot about its pivot axis whereby a second end of said lever member extends outwardly from the second member in a direction parallel to the pedal spindle axis of rotation to engage an actuator member and cause said actuator member to move in an axial direction perpendicular to said rotational directional.

BRIEF DESCRIPTION OF THE DRAWINGS

The foregoing and further features of the present invention will be apparent from the following description of preferred embodiments which are provided by way of example only in connection with the accompanying figures, of which.

DESCRIPTION OF PREFERRED EMBODIMENTS

Figure 1:
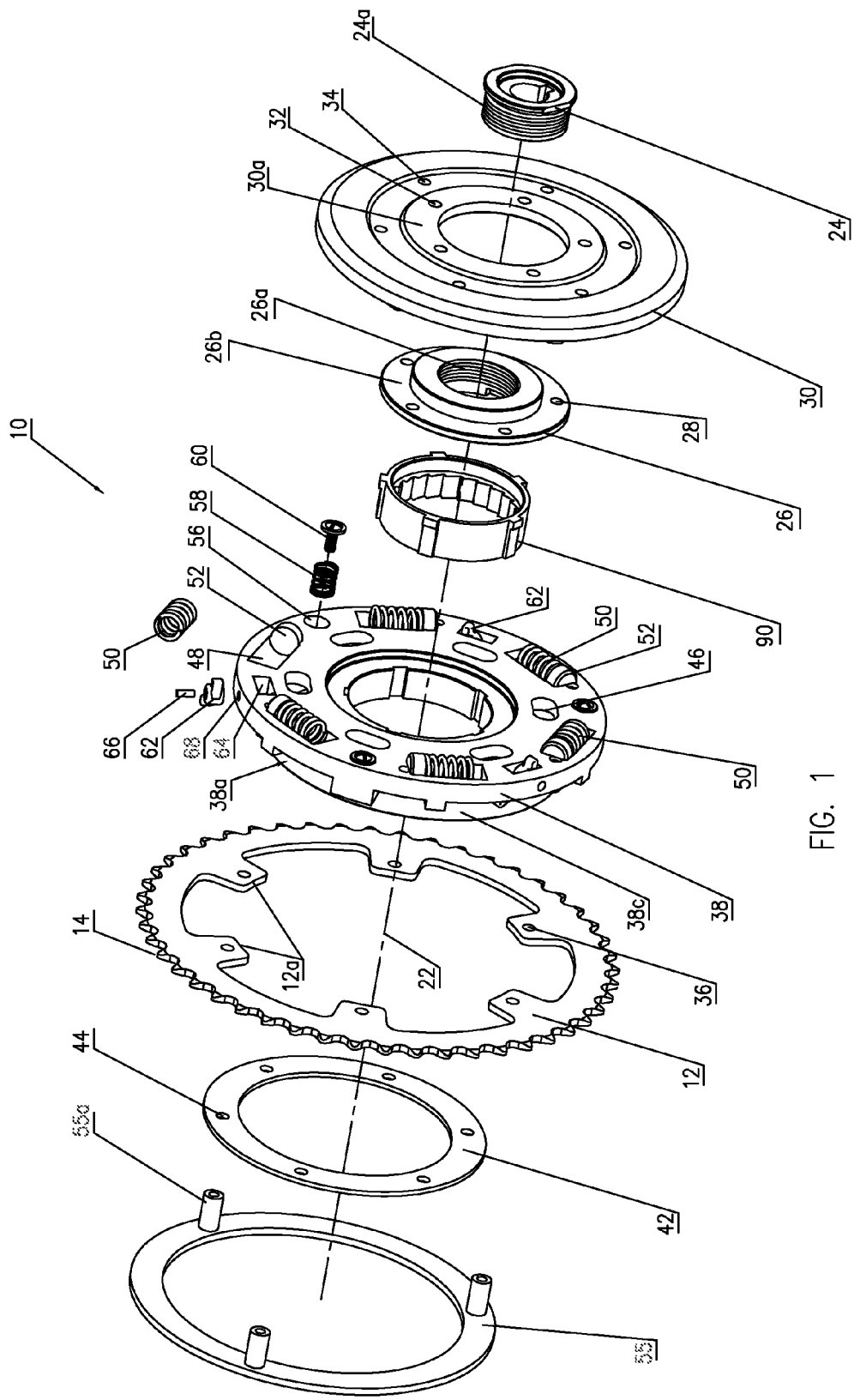
FIG. 1 is an exploded perspective view of a drive sprocket assembly in accordance with an embodiment of the invention.

The invention primarily concerns motorized bicycles, although the invention is applicable to any hybrid apparatus having pedals to provide a human power input and a motor to provide a mechanical power input. A motorized bicycle is a bicycle with an attached motor used to power the vehicle, or to assist with pedaling. Sometimes classified as a motor vehicle, or a class of hybrid vehicle, motorized bicycles may be powered by different types of engines. Motorized bicycles are distinguished from motorcycles by being capable of being powered by pedals alone if required. The actual usage of the pedals varies widely according to the type of vehicle. Some can be propelled by the motor alone if the rider chooses not to pedal. Those known as power-assist bikes have the pedals as the main form of propulsion with the motor used to give a bit of extra power, especially uphill. Many motorized bicycles are based on standard bicycle frame designs and technologies.

In a parallel hybrid motorized bicycle, human and motor inputs are mechanically coupled either in the bottom bracket, the rear or the front wheel, whereas in a (mechanical) series hybrid cycle, the human and motor inputs are coupled through differential gearing. In a (electronic) series hybrid cycle, human power is converted into electricity and is fed directly into the motor and mostly additional electricity is supplied from a battery.

"Pedelec" is a European term that generally refers to an electric bicycle that incorporates a torque and/or a speed sensor and/or a power controller that delivers a proportionate level of assist and only runs when the rider pedals.

The present invention is applicable to all forms of bicycle having both a motor unit and pedals.

Generally speaking, the invention provides a hybrid bicycle which is manually propellable, but may include a motor unit for assisting forward propulsion of the bicycle, although the invention is not limited to this. The bicycle has a control system for providing a control input for another component of the bicycle. More particularly, the bicycle has a controller or adjuster or torque sensor for increasing drive power applied by the motor unit to said bicycle. Alternatively or additionally, where the component is a continuously variable transmission (CVT) for the bicycle, the control input is for continuously varying the gearing ratio of the CVT. Located adjacent a drive sprocket is a moveable plate member. This member may comprise a plate-like form, but is not limited to this form. It is only necessary that the member is moveable relative to the bicycle drive sprocket. The plate member and the drive sprocket are mounted for rotation about an axis of rotation of a pedal spindle, although the sprocket is not fixed for rotation with the pedal spindle. The drive sprocket is loosely coupled to the plate member with the plate member being moveable relative to the sprocket by a limited distance in a rotational direction. The plate member acts on a lever mechanism when it is moved relative to said drive sprocket such that any movement of the plate member results in an axial movement of an actuator member which triggers the control system to generate the control input in response to the amount of any movement of the plate member relative to the sprocket.

More specifically, in a first embodiment the invention concerns a pedal driven apparatus having a controller or control system for increasing drive power applied by a motor to said pedal driven apparatus. The controller may comprise a torque sensor. The apparatus comprises: a first member mounted for rotation about an axis of rotation of a pedal spindle; a drive sprocket mounted for rotation about said axis of rotation of a pedal spindle; and means for detecting movement of said first member relative to said drive sprocket in a rotational direction of said drive sprocket about said pedal spindle axis of rotation. Also provided are means for using said detected movement to control said motor to increase an amount of driving force applied by said motor to said pedal driven apparatus or to use said detected movement to control a gearing ratio for the apparatus. The pedal driven apparatus may comprise a bicycle, although the invention is applicable to other pedal driven apparatuses such as pedalos, for example.

It is to be understood in the following description that the term "drive sprocket" is to be taken to mean any rotational component capable of transferring a driving force to another rotational component and includes, but is not limited to, toothed sprockets for engaging drive chains, belt pulleys for engaging drive belts, or gear wheels for engaging other gear wheels or gear trains.

FIG. 1 is an exploded perspective view of a drive sprocket assembly 10 for a pedal driven apparatus such as a bicycle including parts of a controller or adjuster or torque sensor for increasing a driving force provided by a motor mounted on said pedal driven apparatus. In the following description, reference will be made to a bicycle as an example of a pedal driven apparatus, but it will be understood that the invention is not limited to bicycles and the following description is equally applicable to other types of pedal driven apparatuses such as tricycles, pedalos (pedal boat), or the like.

Referring to the figures, the drive sprocket mechanism 10 comprises a drive sprocket 12 which receives a manual drive force applied to the pedals of the bicycle by a cyclist. The outer periphery of the drive sprocket has teeth 14 which engage a chain drive (not shown) to transfer a driving force to a wheel of the bicycle to cause forward motion of the bicycle. Conventionally, this is the rear wheel. It will be understood that in other pedal driven apparatuses the manual drive applied to the pedals may be conveyed through a suitable drive system to some other drive device for causing motion of the apparatus. For example, in a pedalo, the drive may be transferred to one or more paddles. Furthermore, the drive sprocket in the pedal driven apparatus may engage a belt drive rather than a chain. In such a case, the sprocket may not have teeth, but instead comprises a belt pulley or the like. Alternatively, the drive sprocket may comprise a gear wheel arranged to engage a gear chain for transferring manual force applied to the pedals through the gear train to a forward motion drive system of the apparatus. The invention is applicable to any type of motor unit such as electric motors or even internal combustion engines and to any positioning of the motor on the bicycle as mentioned above.

Figure 3:
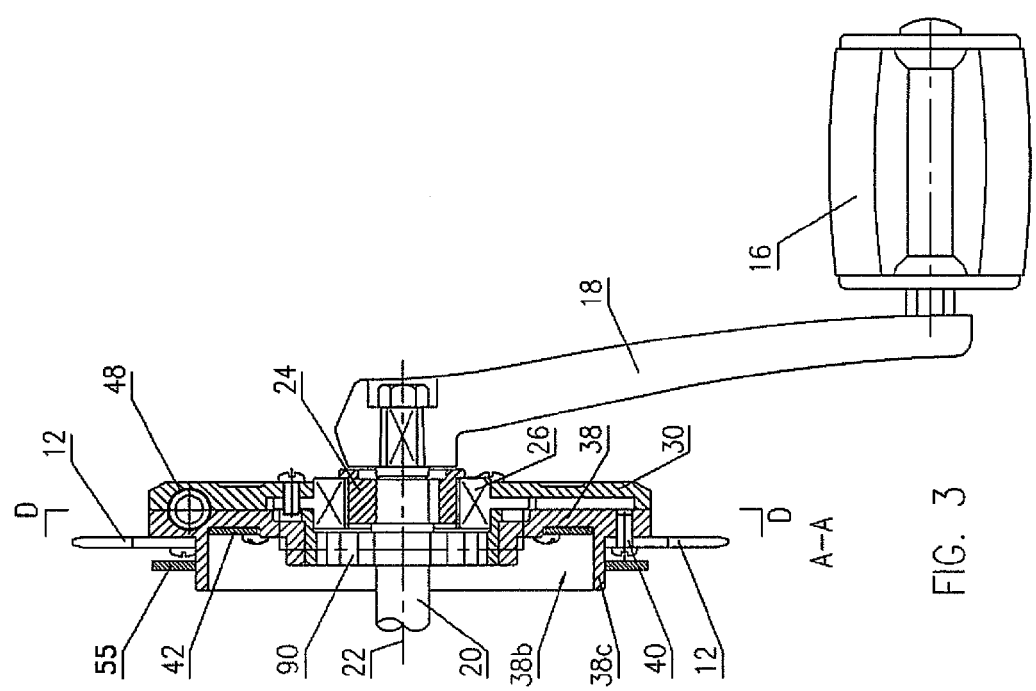
FIG. 3 is a side sectional view along line A-A of FIG. 2.

As shown in FIG. 3, pedals 16 including crank arms 18 are fixedly secured to either end of a pedal spindle 20 in a conventional manner whereby a cyclist can manually drive the pedals 16 to rotate the drive spindle or shaft 20 about the pedal spindle axis of rotation 22 in order to provide a driving force to the sprocket 12. Provided adjacent to one of the pedals (the right side pedal as viewed in FIG. 3) is a collar 24 which is keyed onto the pedal spindle 20 for fixed rotation therewith. The collar 24 has an external screw-threaded portion 24a which is screw-threadedly engaged inside an internal screw-threaded portion 26a of a generally annular mounting plate 26 which, by virtue of it being screw-threadedly fixed to the collar 24 is also fixed for rotation with the pedal spindle 20. Arranged around a peripheral edge portion or flange 26b of the mounting plate is a plurality or set of bolt or screws holes 28. In other not shown embodiments, the mounting plate 26 may be fixed to the collar 24 by other securing means. For example, the mounting plate 26 may be keyed to the collar 24 to secure it to the collar 24 for fixed rotation therewith. Or, the mounting plate 26 may be welded to the collar 24. However, providing a screw-threaded connection between the mounting plate 26 and the collar 24 provides a convenient manner of securing the mounting plate 26 to the collar 24 whilst also enabling subsequent maintenance of the parts in that said parts can be readily separated for maintenance, replacement or the like.

A first member in the form of an annular plate member 30 having two rows 32, 34 of concentric bolt holes is provided. A first inner row 32 of the two rows of concentric bolt holes is provided on an inner annular portion or flange 30a of the plate member 30 which extends axially by a short distance in a direction parallel to the axis of rotation of the pedal spindle 20. This set 32 of bolt holes is complementary to the set 28 of bolt holes provided on the mounting plate 26 and enable the plate member 30 to be bolted to the mounting plate 26 by screws or bolts as best seen in FIG. 3. Thus, the plate member 30 is fixedly secured to the mounting plate 26 and is thereby also mounted for fixed rotation with the pedal spindle 20. In other not shown embodiments, the plate member 30 may be secured to the mounting plate 26 by any suitable means including welding. However, by using a set of bolts or screws to secure the plate member 30 to the mounting plate 26 enables subsequent maintenance of the parts in that said parts can be readily separated for maintenance, replacement or the like. In yet other embodiments, the plate member 30 may be formed integrally with the mounting plate 26 and the collar 24 as a single piece unit in which case the inner row 32 of fixture apertures (inner row of screw holes) is not required.

The drive sprocket 12 has an annular form with inwardly depending splines 12a arranged around an inner peripheral edge thereof. Each spline 12a carries a respective bolt or screw aperture 36. The splines 12a of the sprocket 12 engage in complementary slots 38a in a rear surface of a sprocket mounting member 38. The apertures 36 on the splines 12a allow the sprocket 12 to be fixed to the mounting member 38 using bolts or screws 40 as best seen in FIG. 3. The sprocket 12 is secured to the mounting member 38 for fixed rotation therewith. In other not shown embodiments, the sprocket 12 may be secured to the mounting member 38 by any suitable means including welding. However, by using a set of bolts or screws to secure the sprocket 12 to the mounting member 38 enables subsequent maintenance of the parts in that said parts can be readily separated for maintenance, replacement or the like. In yet other embodiments, the sprocket mounting member 38 may be formed integrally with the sprocket 12 as a single piece unit.

A securing ring 42 is provided which in use is located within a recessed portion 38b on the rear surface of the sprocket mounting member 38. The securing ring 42 has a plurality of screw or bolts holes 44 around its peripheral edge portion. This set of screw holes 44 is complementary to an outer set 34 of the two sets of concentric bolt holes on the plate member 30 such that the plate member 30 and securing ring 42 can be secured to each other through complementary elongated apertures 46 formed in the sprocket mounting member 38 as is best seen in FIG. 3. Consequently, the securing ring 42 and the plate member 30 sandwich the sprocket mounting member 38 and the securing ring 42 holds the plate member 30 in a position closely adjacent a front surface of the sprocket mounting member 38 and loosely coupled to the sprocket mounting member 38, i.e. loosely coupled in the sense that plate member 30 and sprocket mounting member 38 are not fixedly secured to each other but such that they are move relative to each other a limited distance in the rotational direction of the sprocket 12. The elongation of the complementary elongated apertures 46 in the sprocket mounting member 38 allow the plate member 30 and securing ring 42 combination to move relative to the sprocket mounting member 38 and drive sprocket 12 combination in a direction of rotation of the drive sprocket 12. The amount of possible relative movement between the plate member 30 and the sprocket mounting member 38 is, however, limited by the length of the elongated apertures 46 in the sprocket mounting member 38.

Figure 4:
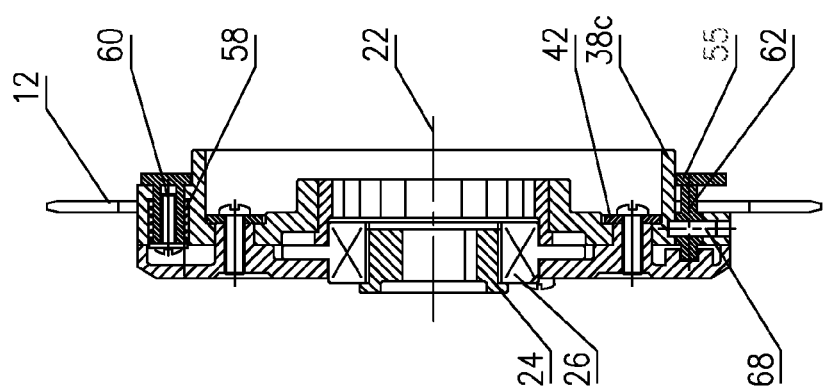
FIG. 4 is a side sectional view along line B-B of FIG. 2.
Figure 5:
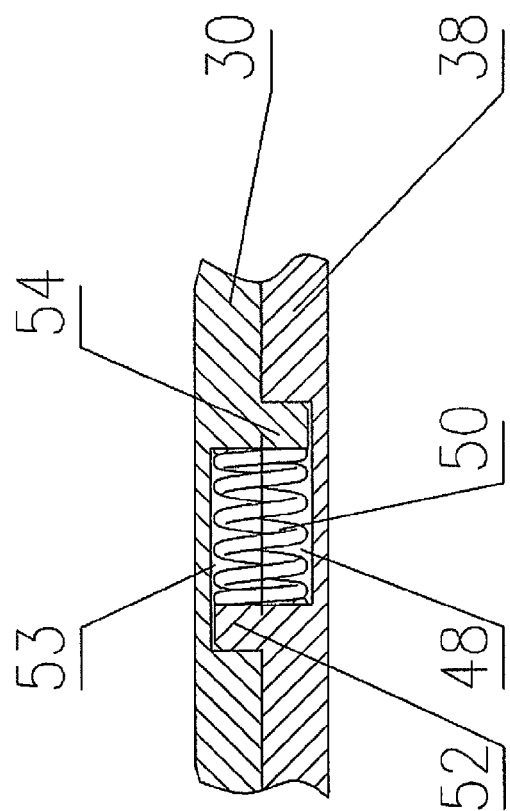
FIG. 5 is an enlarged partial sectional view of the plate member and sprocket mounting member of the sprocket assembly of FIG. 1.

Arranged around the front surface of the sprocket mounting member is a plurality of recesses 48. Each recess 48 contains a first biasing element 50 such as a spring. Preferably, the biasing elements 50 comprise compression springs, although any suitable biasing means or elements could be employed as will be apparent from the following description. The function of the biasing elements 50 is to maintain the plate member 30 in a first rotational position with respect to the sprocket mounting member 38 when no manual pressure is being applied to the pedals 16 of the bicycle, but to allow a small degree of movement of the plate member 30 in a rotational direction of the pedal spindle 20 with respect to the sprocket mounting member 38 when manual pressure is applied to at least one of the pedals 16, preferably a forward pedal when viewed in relation to a forward direction of motion of the bicycle. At a forward end of each recess 48, when viewed in a forward rotational direction of motion of the sprocket 12 and sprocket mounting member 38 combination as seen in FIG. 4, is provided a generally cylindrical boss 52 which extends outwardly beyond the front face of the sprocket mounting member 38 in an axial direction. The boss 52 may be formed integrally with the sprocket mounting member 38 or may comprise a separate component fixed within its recess 48. The boss 52 acts against an end of the biasing element 50 which in this arrangement comprises a compression spring. As can be best seen in FIG. 5, a similar set of bosses 54 is provided in recesses 53 on an inner surface of the plate member 30 which faces the front surface of the sprocket mounting member 38. The bosses 54 provided on the plate member 30 may also be integrally formed therewith or comprise separate components affixed thereto in respective recesses 53. The recesses 53 provided in the plate member 30 are adapted to partially accommodate the first biasing elements 50. Consequently, said recesses 53 in the plate member 30 in concert with said recesses 48 in the sprocket mounting member 38 accommodate the first biasing elements 50 therebetween. The bosses 54 provided on the plate member 30 are arranged to extend axially out from and beyond the inner facing surface of the plate member 30 as viewed in FIG. 1 such that, when the plate member 30 is mounted adjacent to the sprocket mounting member 38, the bosses 54 provided on the plate member 30 locate within respective recesses 48 in the sprocket mounting member 38 to engage opposing ends of the biasing elements 50 as can be best seen in FIG. 5. Similarly, the bosses 52 provided on the sprocket mounting member 38 extend into respective recesses 53 provided in the plate member 30. Consequently, when manual pressure is applied to at least one of the pedals 16 in a forward drive direction, it causes the plate member 30 to move fixedly in rotation with the pedal spindle 20. The sprocket mounting member 38 and sprocket 12 are not mounted such as to move in fixed rotation with the pedal spindle 20 but instead receive drive from the plate member 30, preferably via the biasing elements 50. Therefore, when pressure is applied to at least one of the pedals 16 in a forward direction of motion, the plate member 30 is rotated against the compression of the biasing elements 50 causing movement of the plate member 30 relative to the sprocket mounting member 38 and therefore also causing movement relative to the sprocket 12 in a forward direction of rotation of the pedal spindle 20. The amount of relative movement between the plate member 30 and the sprocket mounting member 38 is limited by the elongated length of the apertures 46 in the sprocket mounting member that loosely accommodate the screws or bolts used for coupling the securing ring 42 to the plate member 30.

Whilst the preferred embodiment is described as having a plurality of first biasing elements 50 preferably in the form of compression springs, it will be understood that in other arrangements there may be provided a single biasing element. This might comprise a coiled spring which is rotationally compressed in use or a torsional spring which is compressed in the axial direction of the pedal spindle 20 in use. It will also be understood that, rather than using compression springs, other types of springs or biasing elements or element may be used which uses extension of the biasing element(s) to maintain the plate member in its normal first position relative to the sprocket mounting member and sprocket.

Figure 2:
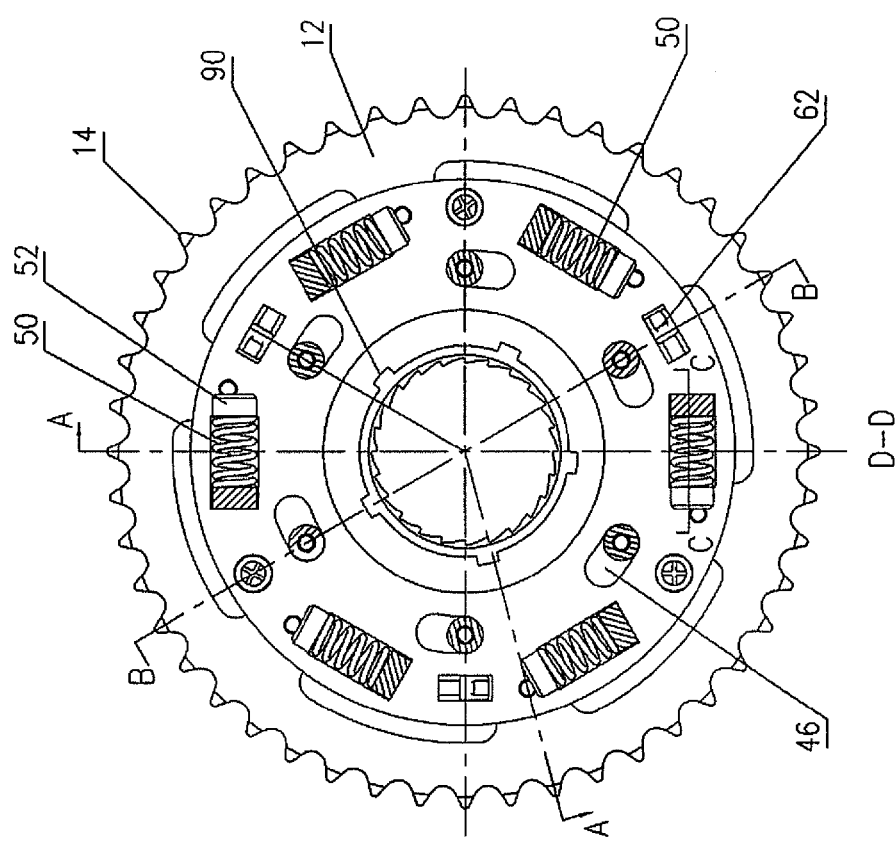
FIG. 2 is a front view of the drive sprocket assembly of FIG. 1.

Moveably mounted around an exterior surface of an annular wall 38c of the sprocket mounting member 38 which defines the recess 38b in the rear surface of the sprocket mounting member 38 is an actuator in the form of a ring member 55. The actuator ring member 55 is mounted on the sprocket mounting member 38 for movement in an axial direction parallel to the pedal spindle axis of rotation 22. The actuator ring member 55 is mounted to the sprocket mounting member 38 such that it is positioned outside the sprocket 12 on a back or rear side of the sprocket mounting member 38 as best seen in FIGS. 2 and 3. The actuator ring member 55 has three posts 55a arranged around its inner surface which are received through complementary apertures (not shown) in the rear surface of the sprocket mounting member 38. The posts 55a have inner screw-threaded portions adapted to receive a mounting screw or bolt 60. Formed in a front surface of the sprocket mounting member 38 are apertures 56 coaxial with the complementary apertures for receiving second biasing elements 58, preferably compression springs. Each of the second biasing elements 58 is positioned such that it surrounds at least a portion of a respective post 55a of the actuator ring member 55, but with its end nearest the actuator ring member 55 acting on an inner surface of the sprocket mounting member 38 with the ring part of the actuator ring member 55 being positioned on the rear side of the sprocket mounting member 38. A respective screw or bolt 60 is received in each of the posts 55a of the actuator ring member 55 such that the head of each screw acts against an opposing end of its respective second biasing element 58. In this arrangement, the actuator ring member 55 is mounted to the sprocket mounting member 38 such that the second biasing elements 58 bias said actuator ring member 55 to a normal position closely adjacent the rear surface of the sprocket mounting member 38. The actuator ring member 55 is moveable, in use, outwardly away from its normal position adjacent the rear surface of the clutch member 38 in an axial direction parallel to the axis of rotation 22 of the pedal spindle against the biasing of the second biasing elements 58.

Whilst the second biasing elements 58 are described as comprising compression springs, it will be appreciated that other types of springs or biasing elements or even only one spring or biasing element may be used to maintain the actuator ring member 55 in its normal position closely adjacent to the rear surface of the sprocket mounting member 38.

At least one lever member 62 is provided in the sprocket mounting member 38 for causing axial movement of the actuator ring member 55 away from the sprocket mounting member 38 when the plate member 30 moves relative to the sprocket mounting member 38 in opposition to the (first) biasing elements 50. The at least one lever member 62 comprises a central cylindrical portion with first and second end portions extending outwardly from said central portion in respective opposing directions. The at least one lever member 62 is mounted in the sprocket mounting member 38 such that a surface of the first end portion thereof engages the plate member 30 and a surface of a second end portion thereof engages the actuator ring member 55. The lever member 62 is preferably mounted to the sprocket mounting member 38 such that it pivots about a pivot axis which extends radially, i.e. perpendicular to the pedal spindle axis 22 through the central portion. The first and second end portions of the lever member 62 subtend an angle less than 180 degrees when viewed from a forward side of the sprocket assembly 10, i.e. when viewed from a forward directional side of the sprocket assembly 10 which is the right hand side as viewed in FIG. 1 or 2.

The sprocket mounting member 38 may have a plurality of such lever members 62 associated therewith. As seen in FIG. 1, each lever member 62 is received in a through hole 64 formed in an outer edge portion of the sprocket mounting member 38. Each lever member 64 is received in its respective through hole 64 such that its first end portion protrudes sufficiently to engage the plate member inner surface and such that its second end portion protrudes sufficiently to contact the actuator ring member inner facing surface. Each lever member 62 pivots about a pivot pin 66 which locates in a radially extending aperture 68 formed in a rim of the sprocket mounting member 38. The lever member 62 is assembled with the sprocket mounting member 38 by firstly presenting the lever member 62 in its through hole 64 in its normal orientation and driving the pivot pin 66 through the axially extending aperture 68 until said pin 66 passes through a pivot bore formed generally centrally of the lever member 62 in its cylindrical central portion. In use, as the plate member 30 moves in a forward rotational direction with respect to the sprocket mounting member 38, the plate member inner surface acts upon the first end of each lever member 62 causing the lever members to rotate. The plate member inner surface may be provided with catches (not shown) extending outwardly from its inner surface by an amount sufficient to engage the end surfaces of the first end portions of respective lever members 62. As each lever member 62 rotates, its second end portion is caused to extend outwardly from the rear surface of the sprocket mounting member 38 to a larger degree that when in its normal position such that it pushes against the inner surface of the actuator ring member 55. The second end portions of the lever members 62 cause the actuator ring member 55 to move axially away from the sprocket mounting member 38 against the biasing of the second biasing elements 50. Consequently, a small relative rotational displacement of the first plate member 30 with respect to the sprocket mounting member 38 (and thus the sprocket 12) results in an axial displacement of the actuator member 55, which axial displacement is proportional to the relative displacement of the plate member 30 to the sprocket 12 in the rotational direction of the sprocket.

In a not shown embodiment where the motor unit comprises an internal combustion engine, the actuator ring member 55 can be arranged to act on a mechanism that adjusts a throttle cable for said internal combustion engine whereby movement of the actuator ring member 55 is translated into a proportional movement of the motor throttle cable to thereby increase fuel supply to the motor and, by consequence, increase an amount of drive force exerted by the motor unit on a part of the bicycle to cause forward motion of the bicycle. The motor drive force may be provided to assist a cyclist in manually propelling the bicycle forward or may, if the cyclist chooses, replace the manual exertion of the cyclist.

In preferred embodiments, the motor comprises an electric motor powered from a battery pack carried on the pedal driven apparatus as will be better understood from the following.

Figure 6:
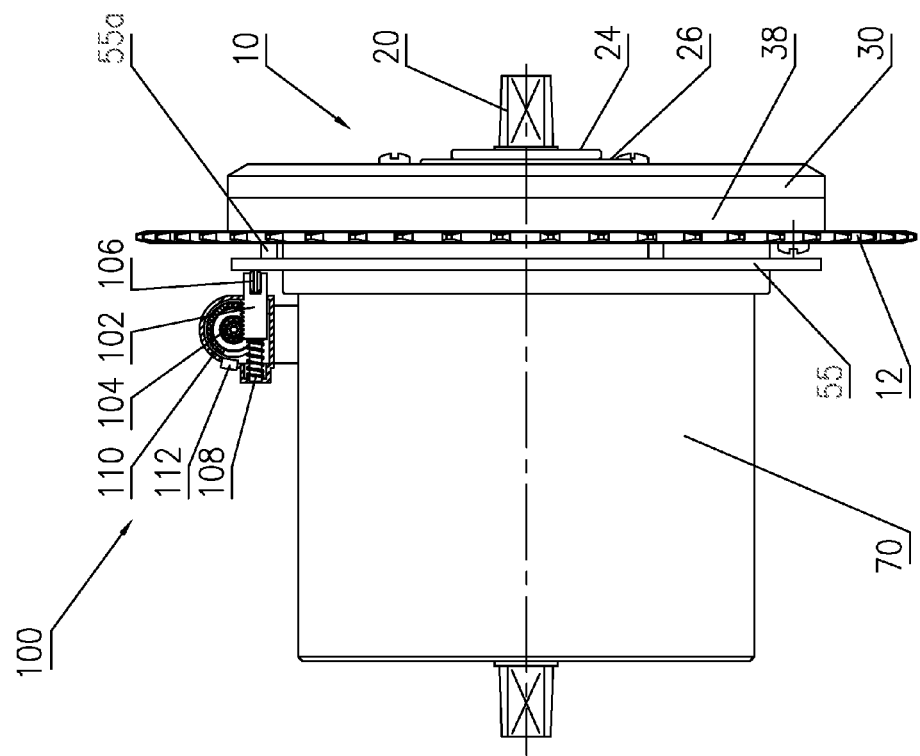
FIG. 6 is a side view of the sprocket assembly of FIG. 1 combined with a motor unit including a an embodiment of a control signal apparatus.
Figure 7:
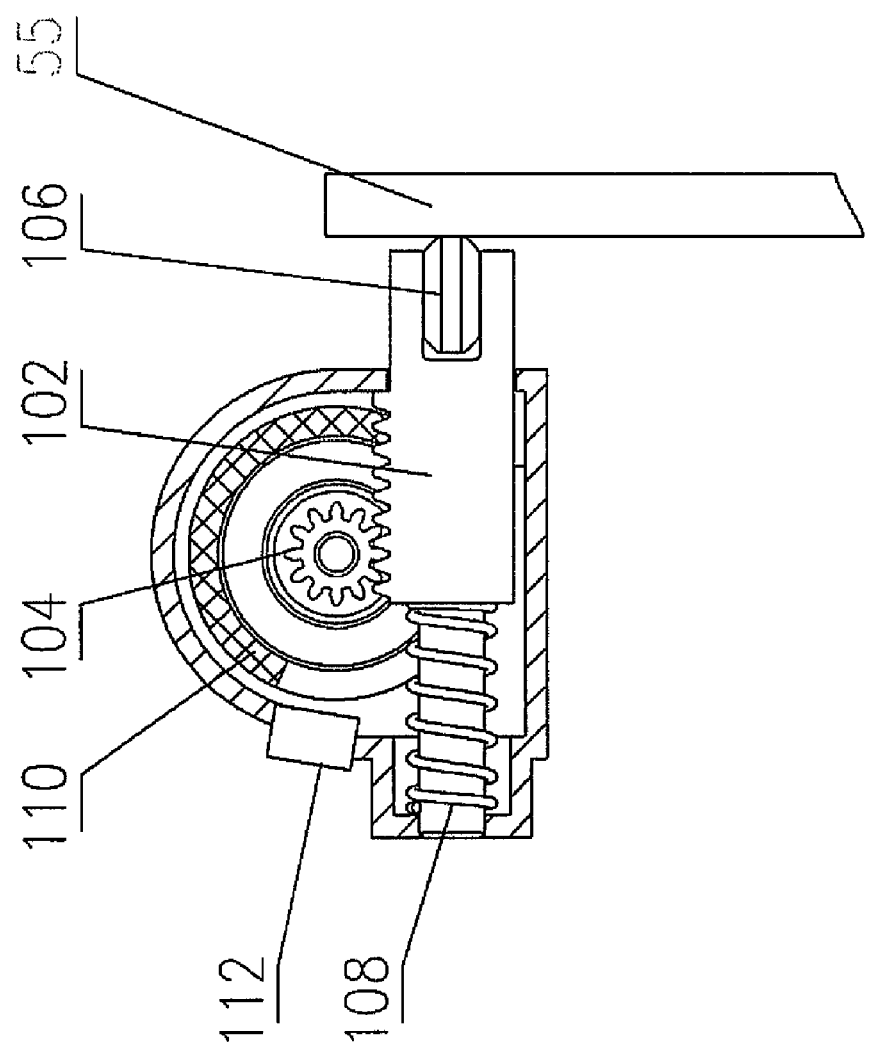
FIG. 7 is an enlarged view of the control signal apparatus shown in FIG. 6.
Figure 8:
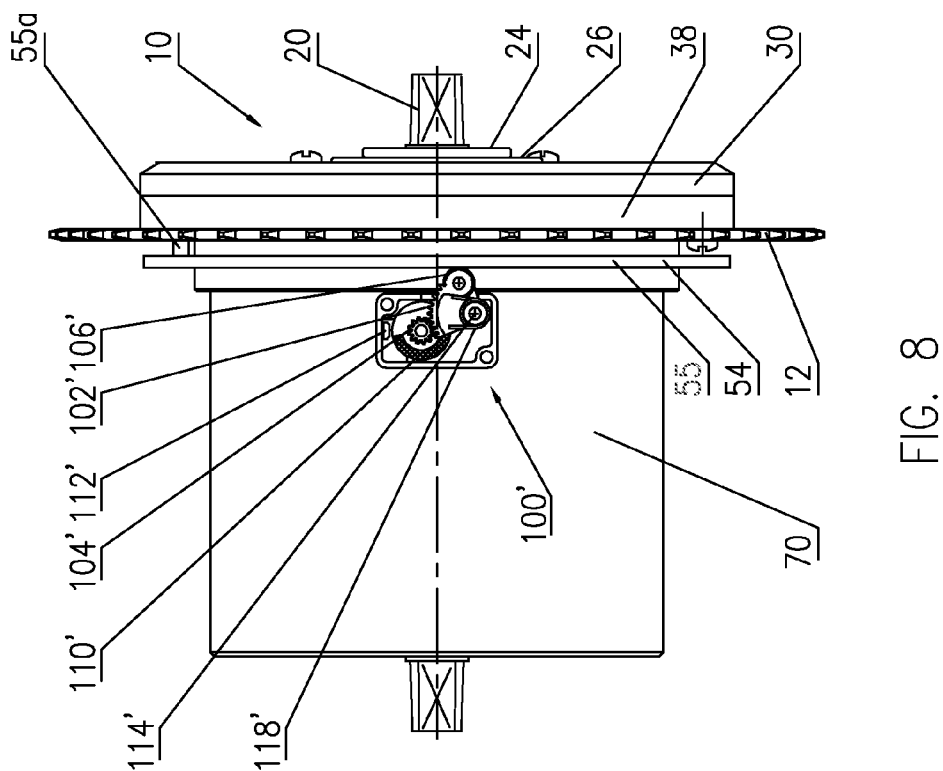
FIG. 8 is a top view of the sprocket assembly of FIG. 1 combined with a motor unit including another embodiment of a control signal apparatus.
Figure 9:
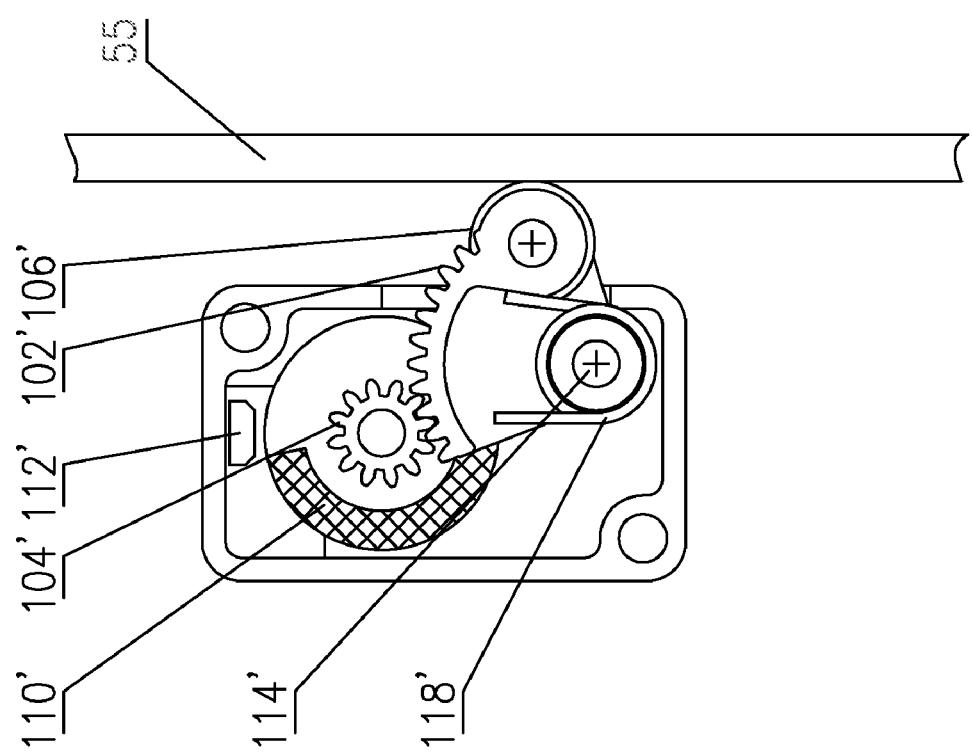
FIG. 9 is an enlarged view of the control signal apparatus shown in FIG. 8.

FIGS. 6 and 7 on the one hand and FIGS. 8 and 9 on the other hand depict alternative mechanisms for translating the axial movement of the actuator ring member 55 into a mechanical control input or an electromagnetic or electrical signal for another component such as the motor, e.g. for adjusting or increasing an amount of drive force delivered by an electric motor of the pedal driven apparatus.

In FIGS. 6 to 9, the motor 70 is mounted concentrically with the pedal spindle 20 such that a rotor part (not shown) of the motor 70 is coupled to the pedal spindle 20 in order to drive the spindle 20. As seen in FIG. 1, it is necessary in this arrangement to provide a one way drive means or over-running bearing 90 (FIG. 1) by which drive from the motor 70 can be delivered to the pedal spindle 20 when the motor 70 is operating, but which allows the sprocket 12 to over-run the one way drive means 90 where the motor 70 is not being operated and drive is being provided manually through the pedals 16. The one way drive means 90 has a splined outer surface which engages in a complementary shaped internal bore of the sprocket mounting member 38. The motor rotor drive shaft (not shown) couples with the one way drive means 90 whereby the motor rotor drive shaft is received in a bore of the one way drive means 90. It will be understood that the one way drive means 90 of FIG. 1 is not an essential component of the sprocket assembly 10 when the motor 70 is not mounted about the pedal spindle 20, i.e. when the motor 70 is mounted to engage, for example, the rear wheel or some other part of the bicycle other than the pedal spindle or shaft 20.

FIG. 6 shows an arrangement where the sprocket assembly 10 of FIG. 1 including the one way drive means 90 is mounted about the pedal spindle 20 with the electric motor 70 also mounted concentrically with the pedal spindle 20 whereby the rotor of the motor is configured to deliver drive to the pedal spindle 20 through the one way drive means 90.

The motor 70 is mounted about the pedal spindle 20 such that the pedal spindle 20 passes through a hollow bore of the motor rotor drive shaft (not shown). The motor rotor drive shaft does not therefore couple directly with the pedal spindle 20 but instead is coupled to the sprocket 12 through the one way drive means 90. The motor 70 may be mounted or coupled to the sprocket mounting member 38 assembly by any suitable means.

Located on the housing of the motor 70 is a rack and pinion mechanism 100 for translating a physical movement into a control input such as an electromagnetic signal for another component on the bicycle. The mechanism comprises a rack 102 and a pinion 104, whereby the rack 102, in use, engages the outer surface of the ring actuator member 55. Consequently, the rack 102 is positioned such that it is always in engagement with the actuator ring member 55 even when said actuator ring member 55 is rotating about the pedal spindle axis of rotation 22. The rack 102 has a small wheel 106 at its free end which facilitates moving contact between the rack 102 and the rotating actuator ring member 55. The rack 102 is biased to occupy a normal position with the wheel 106 on its free end resting against the outer surface of the actuator ring member 55. The rack 102 is mounted to move linearly.

When the actuator ring member 55 is caused to move axially away from the sprocket mounting member 38, it acts against the rack 102 and causes the rack 102 to move linearly in opposition to the rack's biasing component 108 which preferably comprises a compression spring, although any suitable biasing component could be employed. Movement of the rack 102 causes movement of the pinion 104 in a generally conventional manner of a rack and pinion gear assembly.

The pinion 104 carries a metal or magnetic strip 110 which is arranged on movement of the pinion 104 to pass a sensor 112 such as a Hall effect sensor which measures the amount by which the pinion 104 is rotated and which outputs an electromagnetic signal proportional to the amount of movement of the pinion 104. This signal therefore comprises an electromagnetic signal that is proportional to the degree of relative movement of the plate member 30 relative to the sprocket mounting member 38 and thus sprocket 12 of the sprocket assembly 10. However, it will be appreciated that any means of detecting the amount by which the pinion 104 is caused to move and outputting a control input for another component indicative of said amount of movement could be employed. In fact, it will be appreciated that the mechanism 100 need not comprise a rack and pinion arrangement, but any means of detecting movement of the actuator ring member 55 in an axial direction and for converting said sensed movement into a mechanical or electrical and/or electromagnetic signal indicative of the amount by which the actuator ring member 55 has moved thereby providing, for example, a power control signal for the motor 70.

Associated with the motor 70 is control circuitry (not shown) which converts the signal received from the Hall effect sensor 112 and converts it to a control input signal to control an amount of current supplied to the motor 70 in proportion to the detected amount of movement of the actuator ring member 55. Consequently, it is possible to use the actuator ring member movement as a means of controlling the electric motor 70 to deliver more power to the pedal driven apparatus in response to and in direct proportion to the amount of pressure applied by a user to at least one pedal of the apparatus to cause relative displacement of the first plate member with respect to the sprocket.

FIG. 8 also shows another arrangement where the sprocket assembly 10 of FIG. 1 including the one way drive means 90 is mounted about the pedal spindle 20 with the electric motor 70 also mounted concentrically with the pedal spindle 20 whereby the rotor of the motor 70 is configured to deliver drive to the pedal spindle 20 through the one way drive means 90.

Here also, the motor 70 is mounted about the pedal spindle 20 such that the pedal spindle passes through a bore of the motor rotor drive shaft (not shown). The motor rotor drive shaft does not therefore couple with the pedal spindle 20 but instead is coupled to the sprocket assembly 10 through the one way drive means 90. The motor 70 may be mounted or coupled to the sprocket mounting member assembly by any suitable means.

Located on the housing of the motor 70 is an alternative rack and pinion mechanism 100' for translating a physical movement to an electromagnetic signal. The mechanism comprises a curved rack 102' and a pinion 104', whereby the rack 102', in use, engages the outer surface of the ring actuator member 55. Consequently, the rack 102' is positioned such that it is always in engagement with the actuator ring member 55 even when said actuator ring member 55 is rotating about the pedal spindle axis of rotation. The rack 102' has a small wheel 106' at its free end which facilitates moving contact between the rack 102' and the rotating actuator ring member 55. The rack 102' is biased to occupy a normal position with the wheel 106' on its free end resting against the outer surface of the actuator ring member. The rack is mounted to pivot about a pivot point 114'.

When the actuator ring member 55 is caused to move axially away from the sprocket mounting member 38, it acts against the rack 102' and causes the rack to pivot in opposition to the rack's biasing component 108' which preferably comprises a torsional spring, although any suitable biasing component could be employed.

The pinion 104' carries a metal or magnetic strip 110' which is arranged on movement of the pinion to pass a sensor 112' such as a Hall effect sensor which measures the amount by which the pinion is rotated and which outputs an electromagnetic signal proportional to the amount of movement of the pinion. This signal therefore comprises an electromagnetic signal that is proportional to the degree of relative movement of the plate member 30 relative to the sprocket mounting member 38 and thus sprocket 12 of the sprocket assembly 10.

Associated with the motor 70 is control circuitry (not shown) which converts the signal received from the Hall effect sensor 112' and converts it to a control signal to control an amount of current supplied to the motor in proportion to the detected amount of movement of the actuator ring member.

In the embodiments of FIGS. 6 to 9, the rack and pinion mechanism 100, 100' is mounted to the housing of the motor unit 70. It will be appreciated that this is a convenient location for said mechanism in these embodiments where the motor is positioned concentrically with the pedal spindle. These embodiments are advantageous in allowing the control circuitry for converting the movement displacement signal into an electrical control signal to be incorporated within the motor housing or within a suitable controller mounted to the housing of the motor. It also offers a neat and tidy solution to routing electrical signal wiring between the Hall effect sensor and the control circuitry as they are placed so close to each other on the apparatus. However, it will be appreciated that where the motor unit is positioned on another part of the bicycle, the mechanism or device for detecting movement of the actuator ring member may be mounted to the frame of the bicycle such that said mechanism or device is positioned so as to detect said movement of the ring actuator member. Suitable wiring for connecting the movement detection means to the motor control circuitry can be routed through the frame of the bicycle.

In use, a user wishing to take advantage of the motor can operate a switch or the like preferably provided on a handlebar of the bicycle to switch on the power supply to the motor, although in some embodiments no power switch is provided and the motor unit is in an always on mode, but supply of power is only effected when the user exerts sufficient force on at least the forward pedal such that it causes movement of the plate member relative to the sprocket. In this connection, it will be appreciated that the loading of the first biasing elements or means plays an important role in determining a threshold level of force to be applied to the pedals by a user to cause power to be supplied to the motor and thus assist the user in propelling the bicycle in a forward direction.

The power supply preferably comprises a rechargeable battery carried on the bicycle frame. Having switched on the power supply to the motor, the user can then control the amount of power (current) supplied by the power supply to the motor by pressing on at least the forward facing pedal to thereby cause the plate member to be rotationally displaced by a small amount relative to the sprocket. The amount of pressure applied by the user against the biasing means of the sprocket assembly determines the amount of power to be supplied over a permissible range. The novel arrangement taught by the invention removes the need for the cyclist to operate a handlebar mounted throttle control leaving the cyclist's hands free to operate other handlebar mounted controls such as brakes and gear change mechanisms. Furthermore, the use of a power supply control means associated with the pedals allows for a more intuitive control of power supply to the motor than can be achieved through hand actuated controls.

It will be understood that the loading of the first biasing elements or means may be chosen such that under normal cycling conditions such as cycling over flat terrain, normal manual pressure will not cause sufficient displacement between the plate member and the sprocket mounting member to cause axial movement of the actuator member and thus no power will be supplied to the motor unit. However, the biasing means loading may be selected such that where a user is cycling over difficult terrain such as up sloping terrain or where the user is seeking to quickly accelerate even on normal terrain, the increased pressure (compared to normal steady cycling conditions) exerted by the cyclist on the pedals will cause the actuator member to be moved and thus cause an power to be supplied to the motor unit to thereby provide an assistant propelling force to the bicycle.

In alternative embodiments, it will be appreciated that the first biasing means loading may be selected that a user, having switched on power to the motor unit through an appropriate motor power switch unit, needs only apply moderate forward pressure on the leading pedal in order to cause actuation of the actuator member and thus cause power to be supplied to the motor unit. This may be particularly useful in embodiments where the pedals are provided to enable a user to assist the motor unit in powering the bicycle in forward motion where the pedals are therefore only used occasionally. In such an arrangement, the normally not used pedals make a convenient motor torque sensor or motor power adjustment controller.

In the above arrangements, the modified sprocket assembly according to the invention acts as a type of torque sensor in that the pressure applied by a user to the pedals is dependent on the forces acting against the bicycle as it is being propelled whereby, as the resistant forces increase, a user may have to apply more pressure to the pedals making it more likely that the actuator member will be actuated. The actuation of the actuator member and its degree of actuation may be proportional to the torque required to propel the bicycle. It can therefore be envisaged that the modified sprocket assembly according to the invention could be embodied in a torque sensor apparatus or device for an electric bicycle or the like.

In any of the above arrangements of the present invention, control or adjustment of power being supplied to the motor unit is dependent on a user pressing on at least the forward pedal with the degree of pressure linked to the amount of adjustment in the motor unit power level. The invention provides a more convenient mans of controlling or adjusting the level of power being supplied to the motor and also provides a more intuitive means of making adjustments. This is partly because the user can use a back foot (when viewed in the forward direction of motion of the bicycle) as a counterbalance to the forward foot which presses on the forward pedal to cause adjustment of the motor unit power level.

FIGS. 10 to 14 depict another embodiment of the sprocket assembly and bicycle of the invention. In the following description like numerals as used in the description of FIGS. 1 to 9 preceded by an additional numeral "1" will be used to denote like parts with differences between the embodiments described for clarity. It will be understood that, unless otherwise stated, the construction and operation of this embodiment is generally the same as that described in connection with FIGS. 1 to 9 with at least the same variations in structure and configuration as already described.

Figure 10:
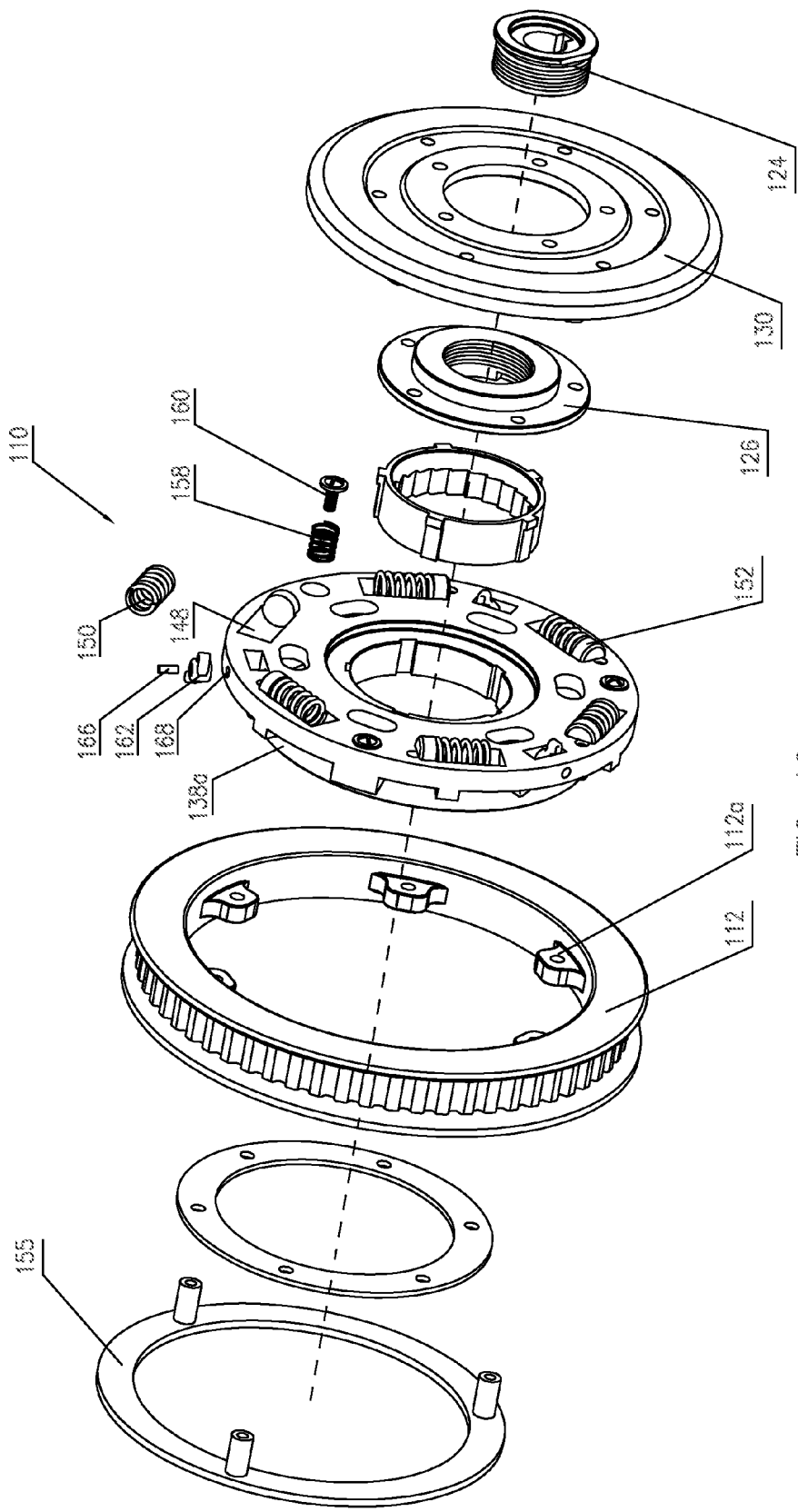
FIG. 10 is an exploded perspective view of a drive sprocket assembly in accordance with another embodiment of the invention.
Figure 11:
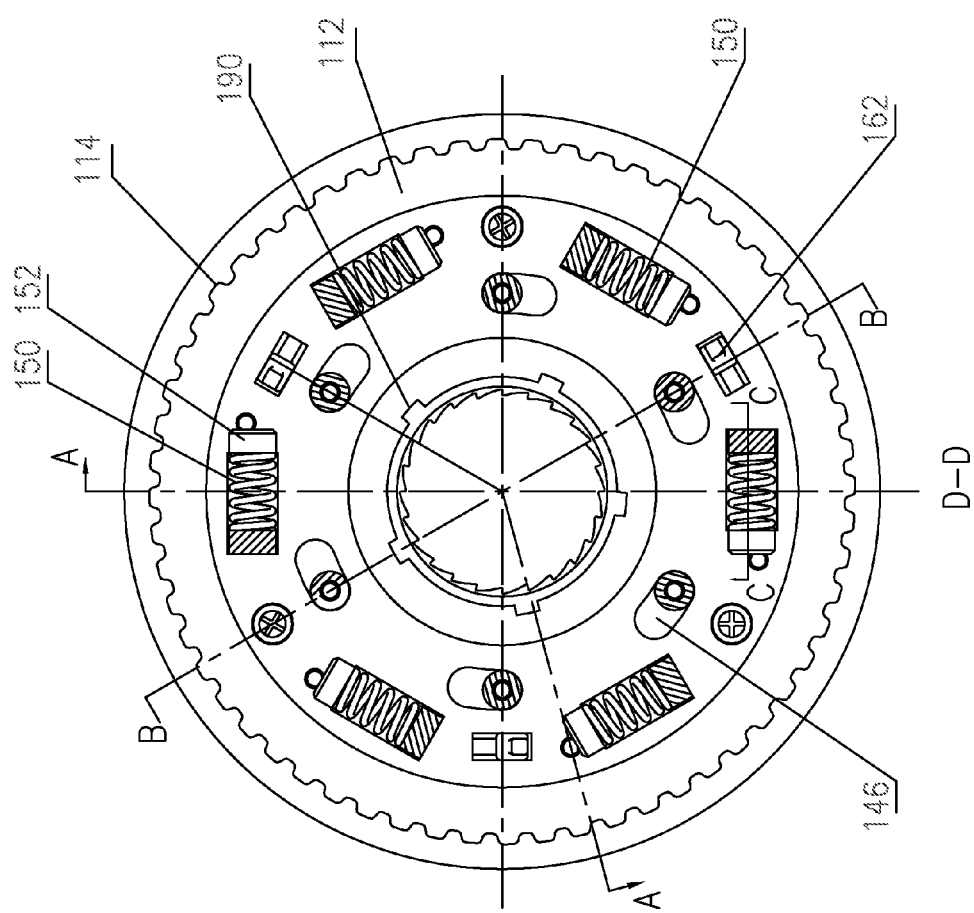
FIG. 11 is a front view of the drive sprocket assembly of FIG. 10.
Figure 12:
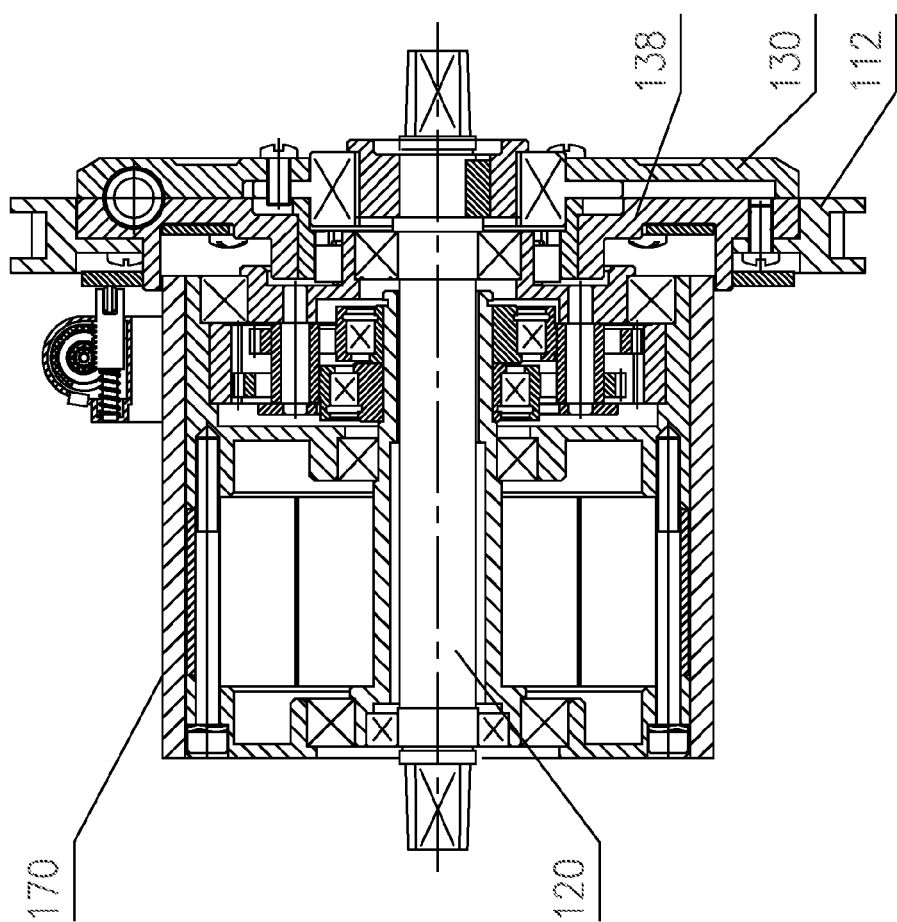
FIG. 12 is a side sectional view of the sprocket assembly of FIG. 10 combined with a motor unit including the control signal apparatus of FIG. 7.
Figure 13:
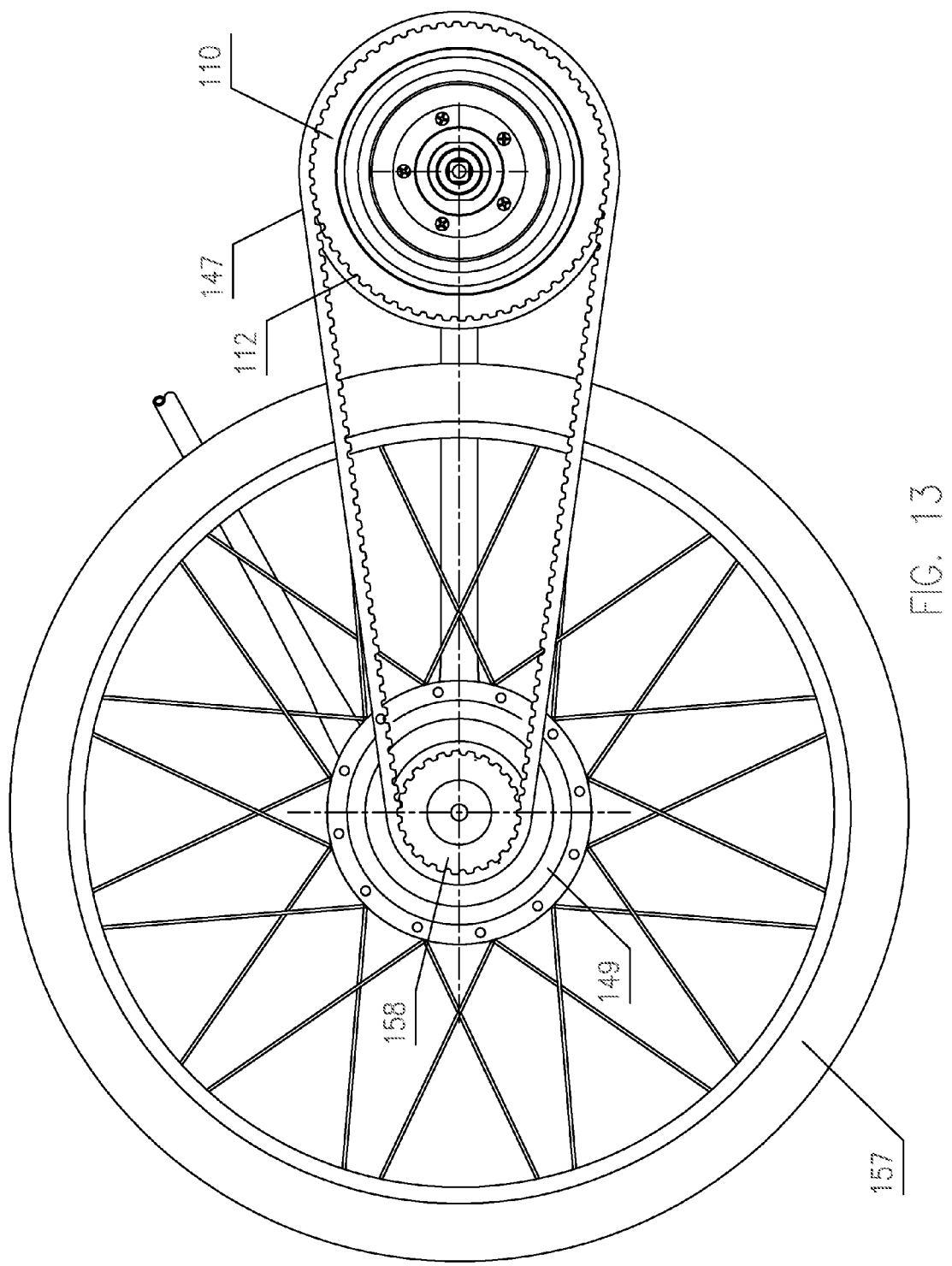
FIG. 13 is a side view of a rear portion of a bicycle according to the invention including the sprocket assembly of FIG. 10.

FIG. 10 is an exploded perspective view of a drive sprocket assembly 110 for this embodiment of the invention with FIG. 11 and FIG. 12 being respectively a front view and a side section view of the drive sprocket assembly, although FIG. 12 also shows the sprocket assembly in combination with a motor unit 170. FIG. 13 is a side view of a rear portion of the bicycle according to this embodiment with FIG. 14 being a top view of the rear portion of the bicycle.

It will be understood by one skilled in the art from the following description of this embodiment that the novel features of this embodiment are not limited to only this embodiment, but are applicable to other embodiments described herein. Furthermore, the novel features of other embodiments are applicable to this embodiment of the invention.

The sprocket assembly 110 of FIG. 10 differs from that of FIG. 1 in that it does not include a toothed sprocket of the type configured to engage a chain drive as conventionally encountered in bicycles, but includes a belt drive. A belt drive pulley 112 is mounted to the sprocket mounting member 138 in a similar manner to the sprocket of the first embodiment (FIG. 1). The belt pulley 112 has inwardly extending spines 112a on its inner surface which locate within recesses 138a provided in the rear surface of the sprocket mounting member 138. The belt pulley 112 is secured to the mounting member 138 so as to be fixed for rotation therewith. The belt pulley 112 partially fits over an outer circumferential surface of the sprocket mounting member 138 such that it covers the apertures 168 for receiving the pins 166 which pivotally mount the lever members 162 to the sprocket mounting member 138 thereby usefully securing said pins 166 in place.

The belt pulley 112 has rectangular shaped teeth which, in use, engage a complementary shaped toothed portion provided on an inner surface of a belt drive member 147 (FIG. 13). The belt drive member 147 drives a smaller belt pulley 158 provided on a hub 149 of a rear wheel 157 of the partially shown bicycle as seen in FIG. 13. Otherwise, the sprocket assembly of FIGS. 10 to 14 operates to generate a control input in the manner described with respect to FIGS. 1 to 9, although the control input may be used for another purpose other than to control the motor 170 as will be explained below.

Figure 14:
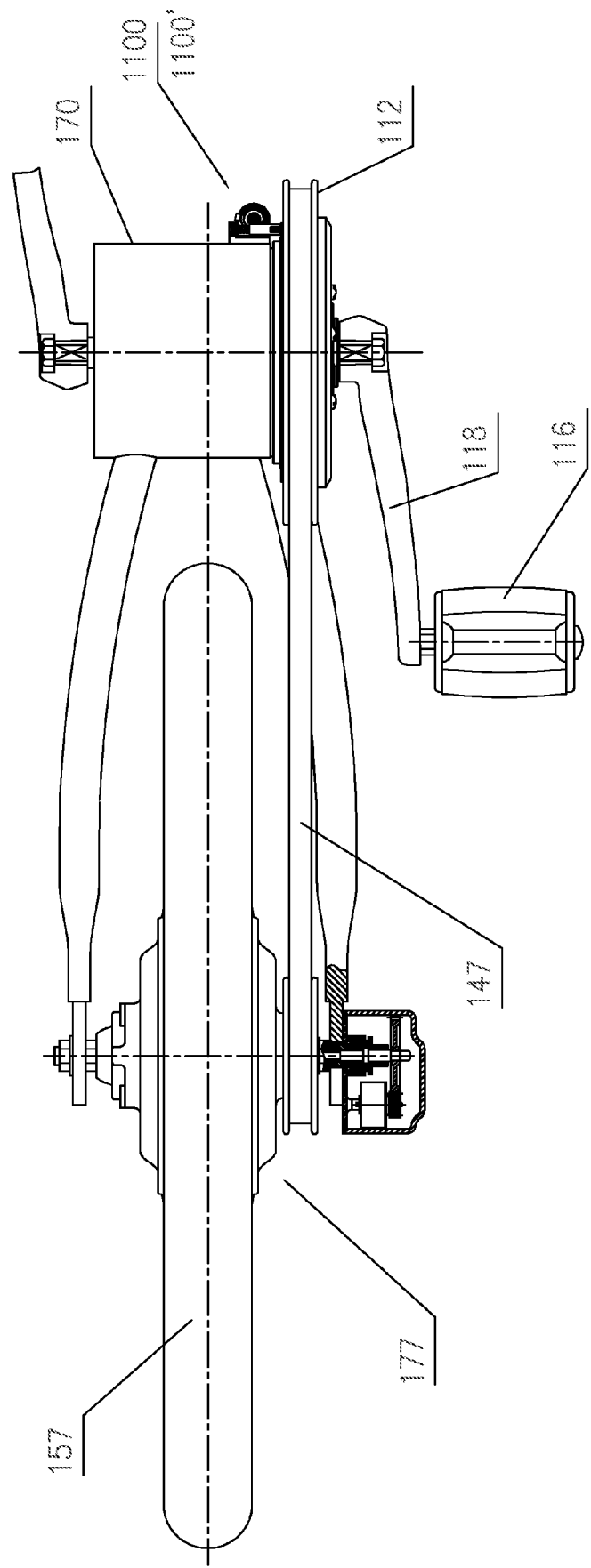
FIG. 14 is a top view of the rear portion of a bicycle of FIG. 13.

FIGS. 12 and 14 illustrate that the motor 170 is mounted concentrically of the pedal spindle 120, but it will be understood that this is not an essential feature of this embodiment. FIG. 12 illustrates that a rack and pinion assembly 1100, 1100' of the types depicted by FIGS. 6 to 9 is mounted to a housing of the motor 170, although, where the motor 170 is not arranged concentrically with the pedal spindle 120, the rack and pinion mechanism 1100, 1100' may be mounted to the frame of the bicycle, for example. FIG. 14 illustrates that the bicycle of this embodiment is provided with a gearing ratio adjustment mechanism 177 which will be more fully described below in connection with other embodiments of the invention.

Figure 15:
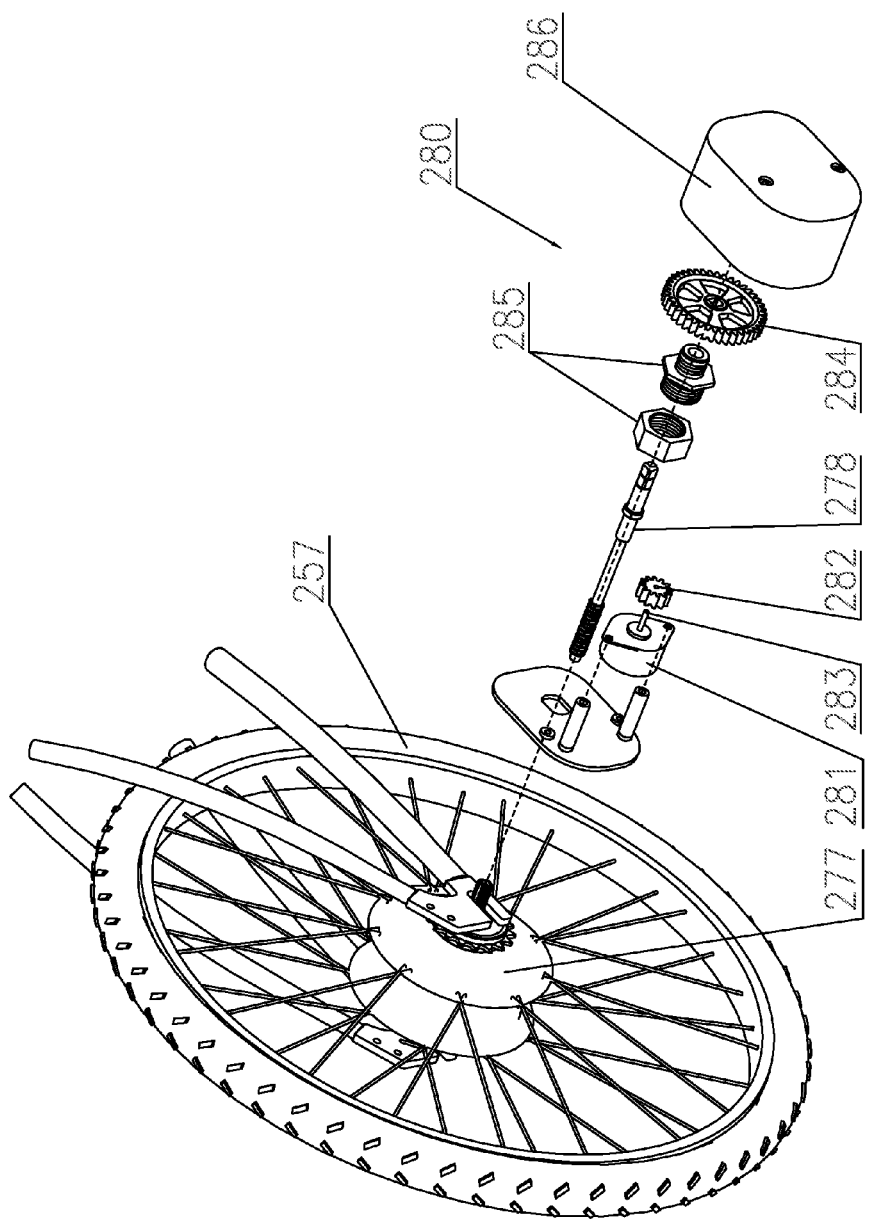
FIG. 15 is an exploded perspective view of a rear wheel assembly of a bicycle including a gear adjustment mechanism according to the invention.
Figure 16:
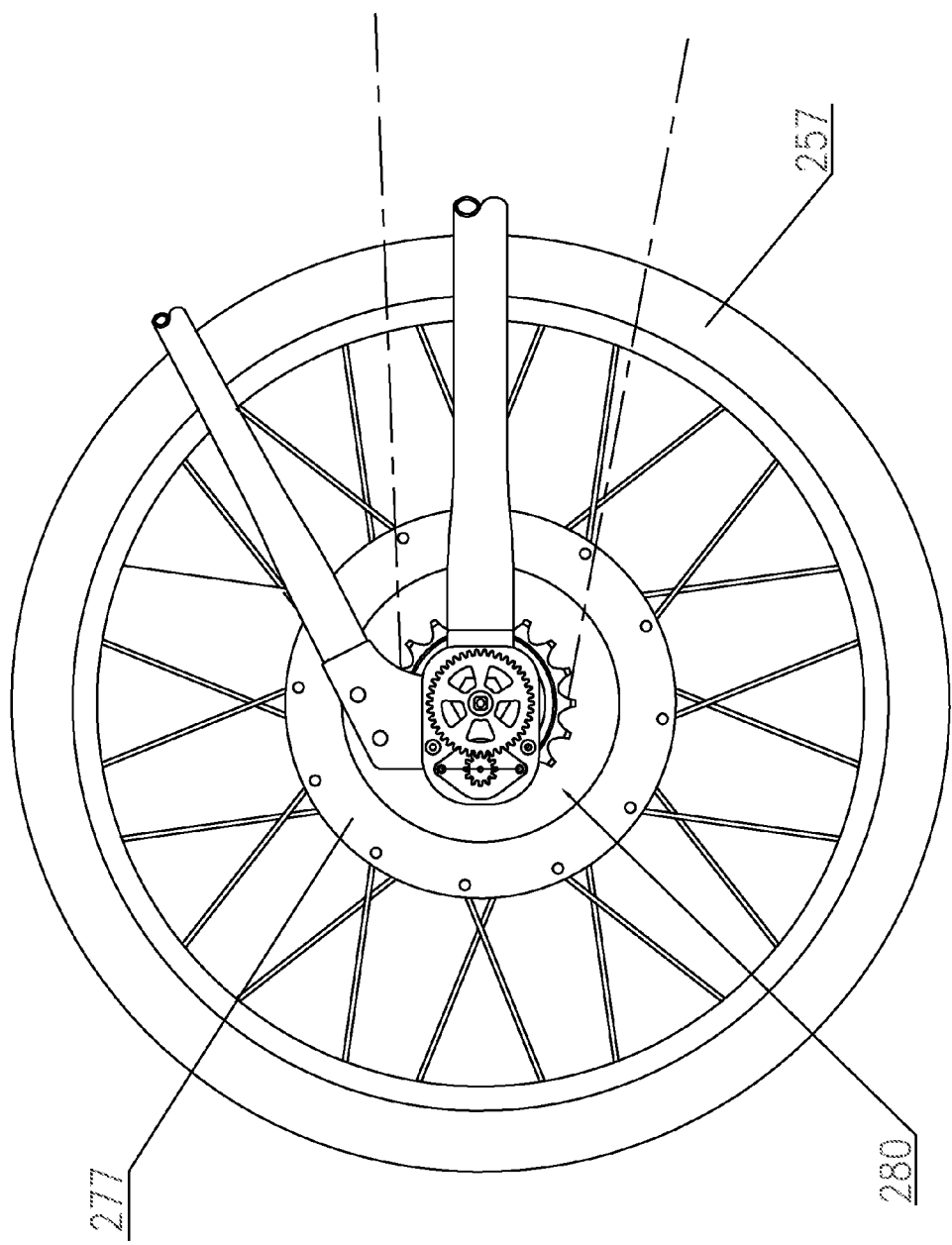
FIG. 16 is a side view of a rear portion of the bicycle of FIG. 15.
Figure 17:
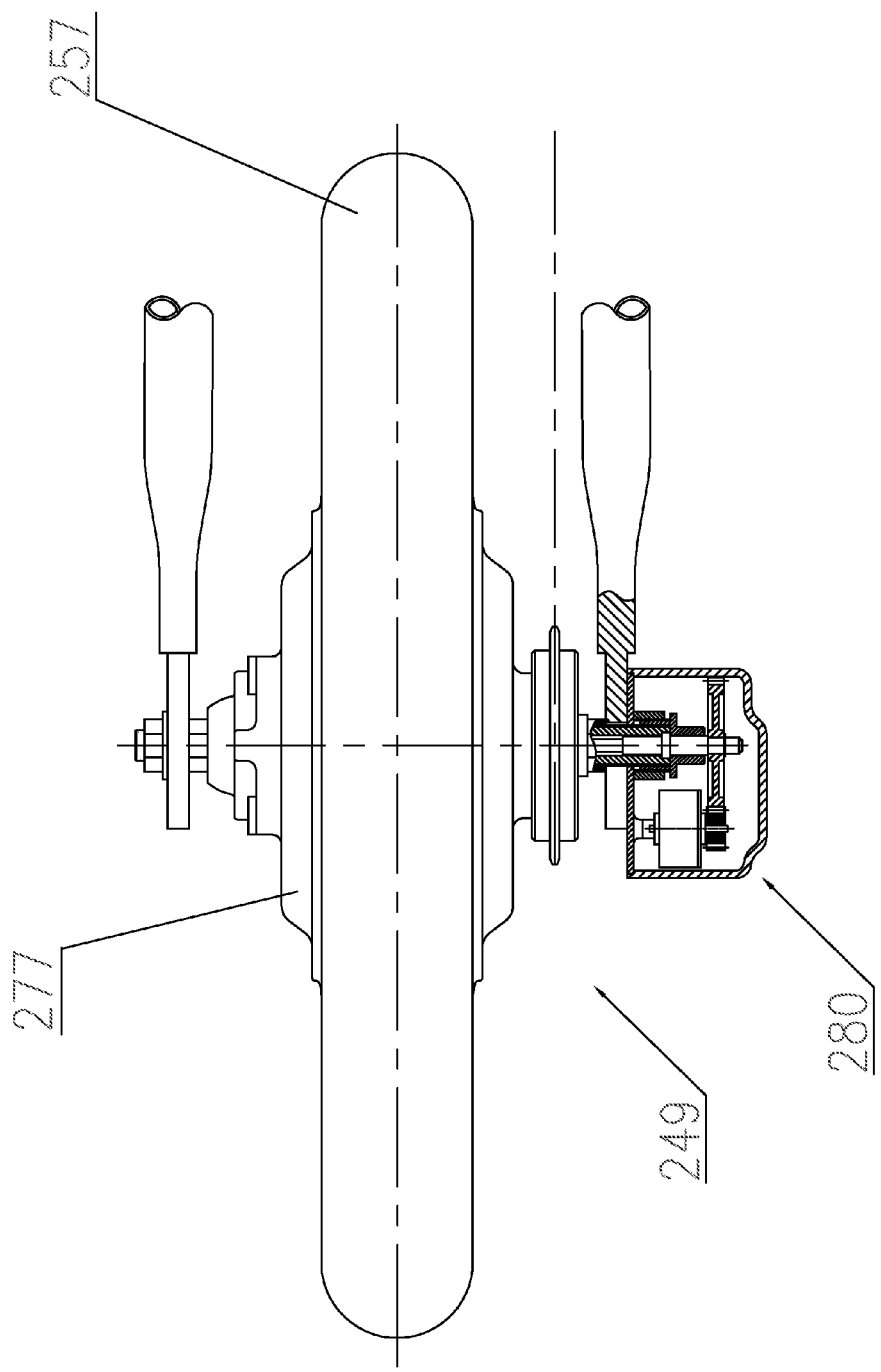
FIG. 17 is a top view of a rear portion of the bicycle of FIG. 15.

FIGS. 15 to 17 depict another embodiment of a bicycle according to the invention. In the following description like numerals as used in the description of FIGS. 1 to 9 and/or the description of FIGS. 10 to 14 preceded by an additional numeral "2" will be used to denote like parts with differences between the embodiments described for clarity.

FIG. 15 is an exploded perspective view of a rear wheel assembly of the bicycle of this embodiment of the invention including a gear adjustment mechanism 277. FIG. 16 is a side view of said rear portion of the bicycle and FIG. 17 is a top view of said rear portion of the bicycle.

It will be understood by one skilled in the art from the following description of this embodiment that the novel features of this embodiment are not limited to only this embodiment, but are applicable to other embodiments described herein. Furthermore, the novel features of other embodiments are applicable to this embodiment of the invention.

Alternative to or in addition to a motor unit, the bicycle may include a gearing adjustment means. Said gearing adjustment means is configured to receive a control input from said converting means for causing said gearing adjustment means to effect a gearing change for the pedal driven apparatus. The gearing adjustment means may be associated with a rear wheel of the bicycle and is configured to receive the control input from the converting means to thereby effect a change in a gearing ratio applied to the rear wheel. The gearing adjustment means may comprise a continuous variable transmission (CVT) system having a continuously variable gearing ratio, said CVT system being configured to receive said input control signal and adjust the gearing ratio by an amount proportional to the movement detected by the movement detecting means. The CVT system may be configured to continuously vary the gearing ratio in response to said input control signal. Preferably, the CVT system has a servo-motor associated therewith which is configured to receive said input control signal whereby operation of the servo-motor in response to the input control signal effects a continuously variable change in the gearing ratio through movement of a control pin of the CVT system.

This embodiment may include a chain drive as per the first embodiment of FIGS. 1 to 9 or a belt drive as per the second embodiment of FIGS. 10 to 14. This embodiment may include a motor concentrically mounted with the pedal spindle or a motor mounted at another point on the bicycle to provide drive power for propelling the bicycle forwards. However, this embodiment may not include a motor to assist forward propulsion of the bicycle, but may be powered by only pedals in a conventional manner. This embodiment of a bicycle according to the invention must, however, include a sprocket assembly (not shown) of the type already described with respect to FIGS. 1 to 9 or FIGS. 10 to 14 having a means for detecting movement of a first member relative to the sprocket in a rotational direction of the sprocket and a means for converting said detected movement into a control input. The sprocket assembly having these means can therefore be according to any of the foregoing embodiments of the invention as hereinbefore described. In this embodiment, the control input indicative of an amount of movement of the first member relative to the sprocket is used in connection with the gearing adjustment mechanism 277.

The gearing adjustment mechanism 277 is mounted in association with a hub 249 of the rear wheel 257. Its function is to change a gearing ratio applied between the drive received by the hub 249 and the rotation of the rear wheel 257. The gearing adjustment mechanism 277 may comprise a conventional gear shift mechanism whereby the gearing ratio is changed in discrete steps. Preferably, however, the gear adjustment mechanism 277 comprises a continuously or constantly variable transmission (CVT). A continuously variable transmission (CVT) is a transmission which can change steplessly through an infinite number of effective gear ratios between maximum and minimum values. This contrasts with other mechanical transmissions that only allow a few different distinct gear ratios to be selected. The flexibility of a CVT allows the driving shaft to maintain a constant angular velocity over a range of output velocities.

The CVT 277 may be of any know type of CVT transmission. However, in order to modify the CVT 277 for use in the bicycle according to the invention, the CVT 277 includes an adjusting mechanism 280 which operates to adjust the position of an operating pin 278 of the CVT 277. In use, movement of the pin 278 inwardly towards or outwardly away from the CVT 277 causes a change in the current gearing ratio of the CVT 277. The operation of the pin is in a known manner. However, the modification provided in this embodiment of the invention is to modify the CVT 277 to include the adjustment mechanism 280 and to control the adjustment mechanism 280 in response to the control input from the sprocket assembly.

The adjustment mechanism 280 has components including a servo motor 281 having a pinion gear 282 on its output shaft 283. In use, the servo motor pinion gear 282 drives a large gear 284 which, through an adjustment bolt and nut combination 285, adjusts the position of the pin 278 with respect to the CVT 277 thereby changing the gearing ratio of the CVT 277. The components of the adjustment mechanism are contained in a housing 286, Control circuitry (not shown) associated with the servo motor 281 receives as an input a signal comprising the control input from the sprocket assembly which is indicative of an amount by which the plate member of the sprocket assembly has moved relative to the sprocket under manual pressure applied to at least a forward one of the pedals of the bicycle. Consequently, a cyclist wishing to change the gearing ratio is able to do so through application of pressure on at least the forward one of the bicycle's pedals whereby this causes relative rotational displacement between the plate member and the sprocket and whereby the rack and pinion mechanism associated with the sprocket assembly converts the detected movement into a control signal. In this embodiment, it is preferable that the control input comprises an electrical or electronic control signal that is used to control operation of the servo motor 281 to thereby cause the adjustment mechanism 280 to change the position of the pin 278 inwardly or outwardly of the CVT 277.

Figure 18:
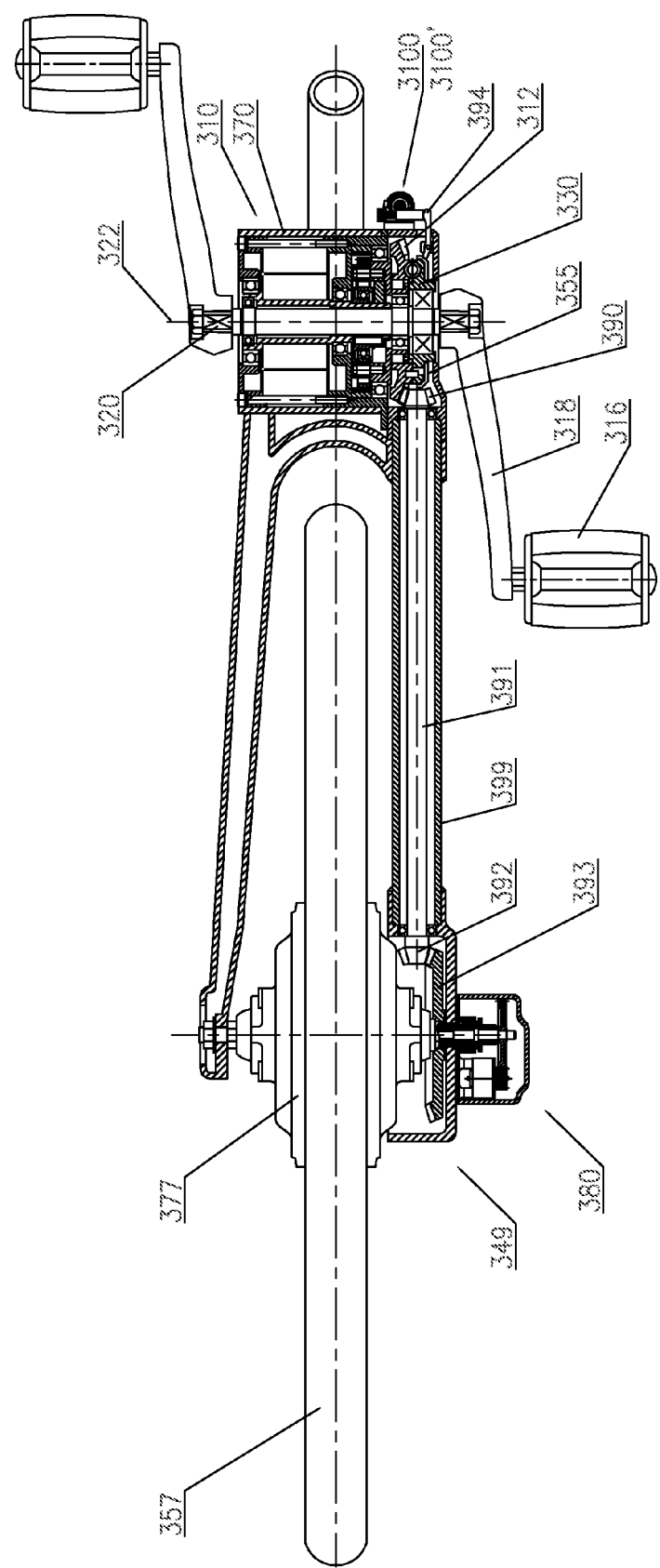
FIG. 18 is a partial sectional top view of a rear portion of a bicycle according to another aspect of the invention.

FIG. 18 depicts another embodiment of a bicycle according to the invention. In the following description like numerals as used in the description of FIGS. 1 to 9, the description of FIGS. 10 to 14 and/or the description of FIGS. 15 to 17 preceded by an additional numeral "3" will be used to denote like parts with differences between the embodiments described for clarity.

FIG. 18 is a partial sectional top view of a rear portion of a bicycle according to another aspect of the invention. This embodiment of a bicycle according to the invention may comprise a motor unit 370 as shown concentrically mounted with the pedal spindle shaft 320, but it will be appreciated that the motor may not be concentrically mounted with the pedal spindle shaft but instead mounted on another part of the bicycle. Furthermore, this embodiment may not include a motor and may, in common with the embodiment described with respect to FIGS. 15 to 17, use the control input provided by the sprocket assembly 310 to control adjustment of a gearing ratio of a CVT 377 provided in a rear hub 349 of the rear wheel 357 of the bicycle.

It will be understood by one skilled in the art from the following description of this embodiment that the novel features of this embodiment are not limited to only this embodiment, but are applicable to other embodiments described herein. Furthermore, the novel features of other embodiments are applicable to this embodiment of the invention.

This embodiment of a bicycle according to the invention differs from other embodiments in that the sprocket comprises a front gear wheel 312. The front gear wheel 312 has a beveled toothed portion around its circumference which engages a first bevel gear 390 provided on a first end of a drive rod 391. A complementary second bevel gear 392 is provided on a second, opposite end of the drive rod 391 and this second bevel gear 392 in turn engages a rear beveled gear wheel 393 mounted on the hub 349 of the rear wheel 357 of the bicycle. The drive rod is rotatably supported by bearings 397, 397. The drive rod 391 and first and second bevel gears 390, 393 may be accommodated in a housing 399 which forms part of the frame of the bicycle, i.e. which forms one of two rear facing struts to which the rear wheel 357 is rotatably mounted. In use, drive applied to the front gear wheel 312 of the sprocket assembly 310 is conveyed via the first and second bevel gears 390, 392, the drive rod 391 and the rear gear wheel 393 to a CVT 377 provided in the hub 349 of the rear wheel. In this manner, the bicycle according to this embodiment of the invention does not use a chain or belt drive, but uses a gear and drive rod combination for transferring drive from the front gear wheel sprocket 312 to the rear wheel 357 of the bicycle.

In addition to the above described difference, another difference between this embodiment and other embodiments of the invention is that the means for detecting movement of a first plate member 330 of the sprocket assembly 310 relative to the gear wheel sprocket 312 includes an actuator ring member 355 mounted adjacent a front face of the plate member 330. The actuator ring member 355 has a chamfered edge portion which engages a lever member 394 to transfer axial movement of the actuator ring member 355 away from the plate member 330 to a rack and pinion mechanism 3100, 3100' of the type illustrated in FIGS. 6 to 9. In this embodiment as in other embodiments, the plate member 330 is configured to have a limited amount of rotational displacement relative to the gear wheel sprocket 312 under certain conditions when manual pressure is applied by a cyclist to at least a forward one of the pedals 316. Generally speaking, the sprocket assembly 310 of this embodiment works in largely the same manner as the sprocket assembly of FIGS. 1 to 9 save for the differences in structure described above. Furthermore, the CVT 377 of this embodiment works in largely the same manner as the CVT 277 described with respect to FIGS. 15 to 17.

FIGS. 19 to 25 depict another embodiment of a bicycle according to the invention. In the following description like numerals as used in the description of FIGS. 1 to 9, the description of FIGS. 10 to 14, the description of FIGS. 15 to 17 and/or the description of FIG. 18 preceded by an additional numeral "4" will be used to denote like parts with differences between the embodiments described for clarity.

Figure 19:
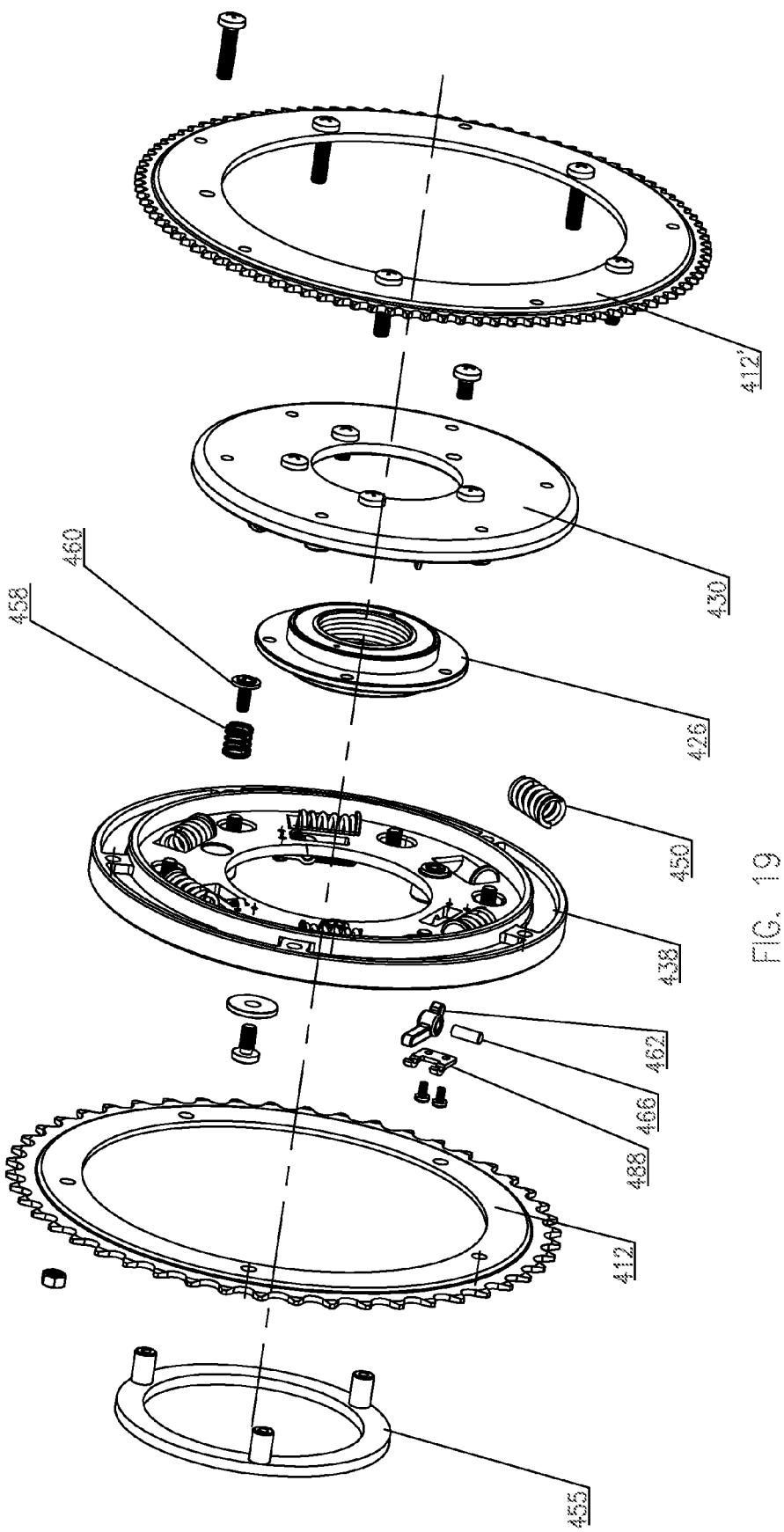
FIG. 19 is an exploded perspective view of a drive sprocket assembly in accordance with another embodiment of the invention.
Figure 20:
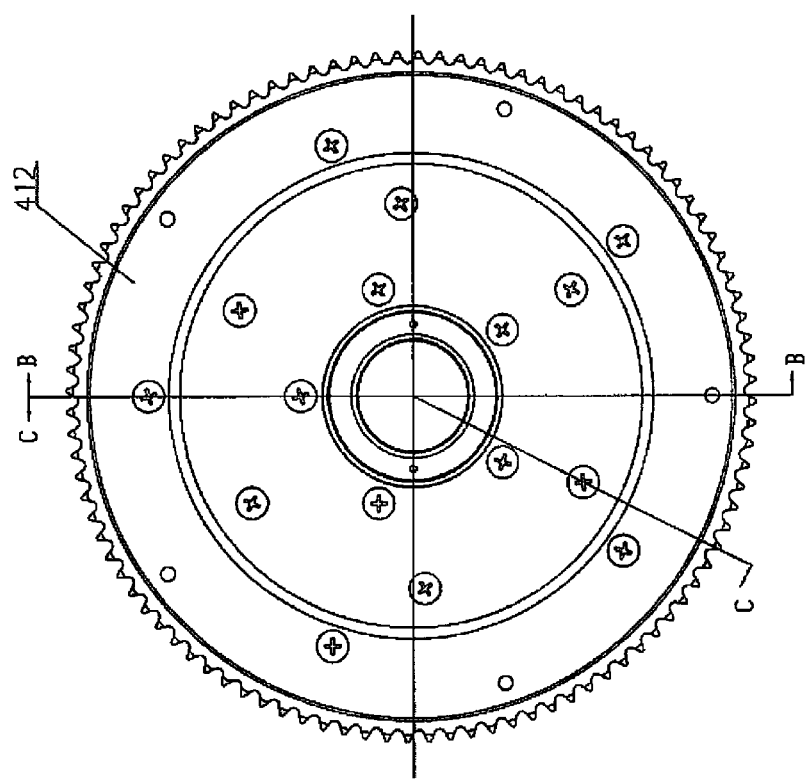
FIG. 20 is a front view of the sprocket assembly of FIG. 19.
Figure 21:
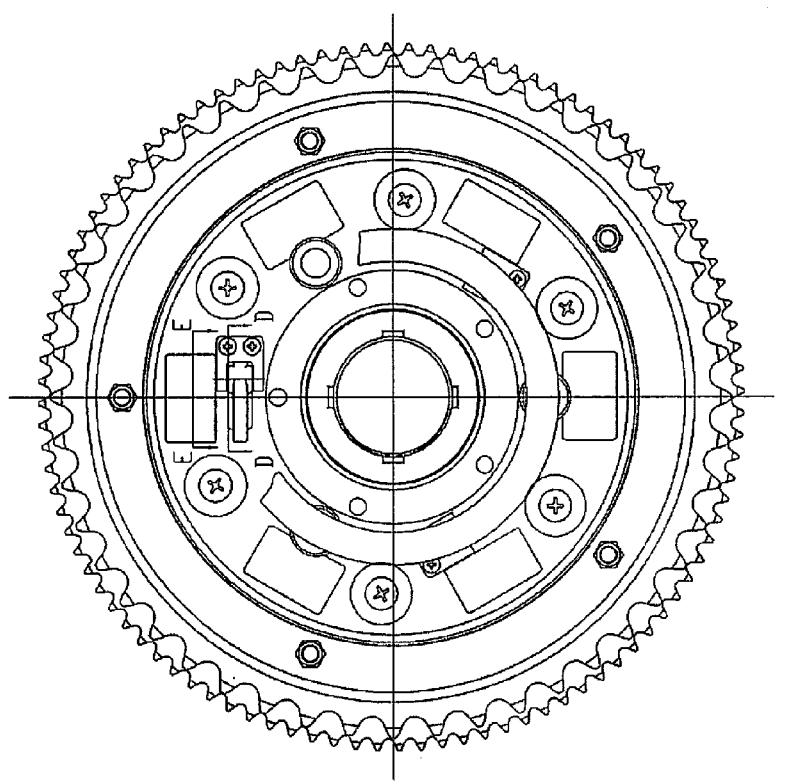
FIG. 21 is a rear view of the sprocket assembly of FIG. 19.
Figure 22:
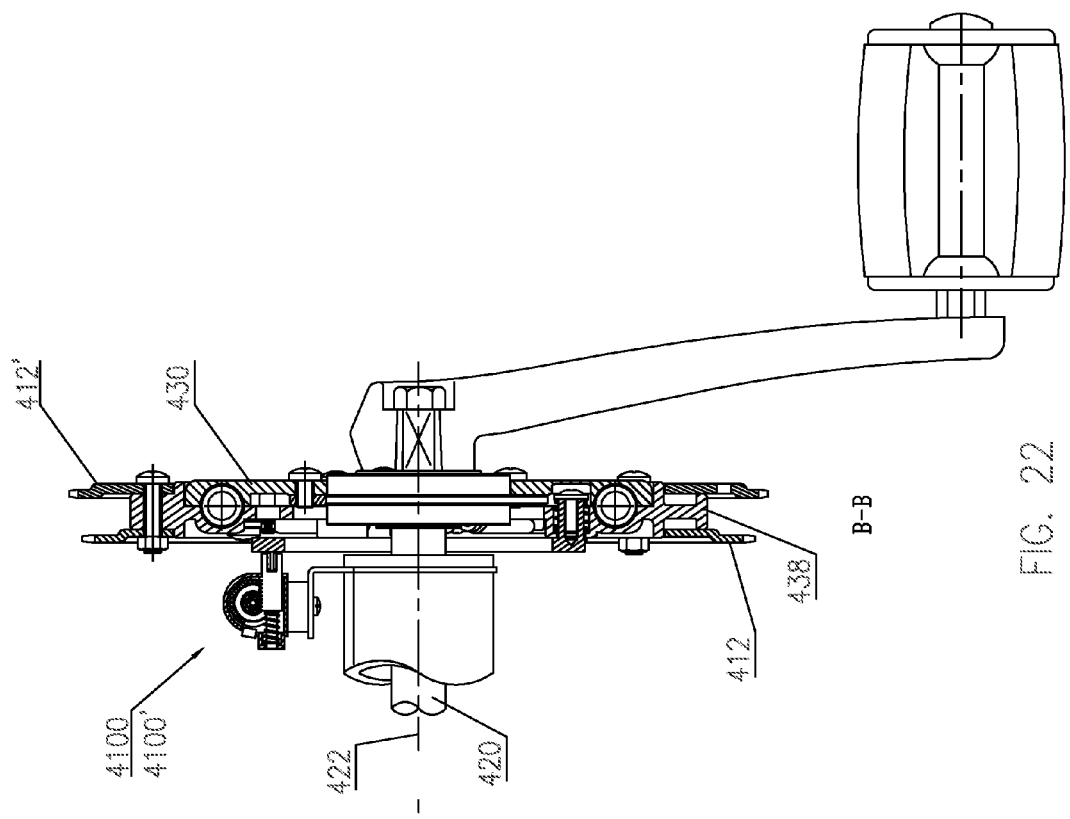
FIG. 22 is a side sectional view along line B-B of FIG. 19.
Figure 23:
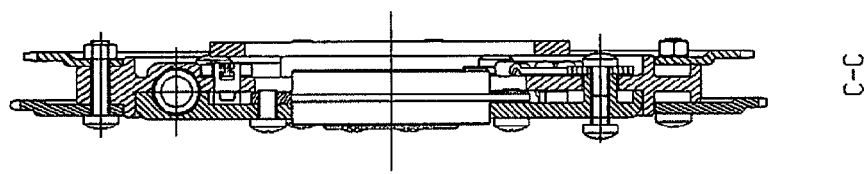
FIG. 23 is a side sectional view along line C-C of FIG. 19.
Figure 25:
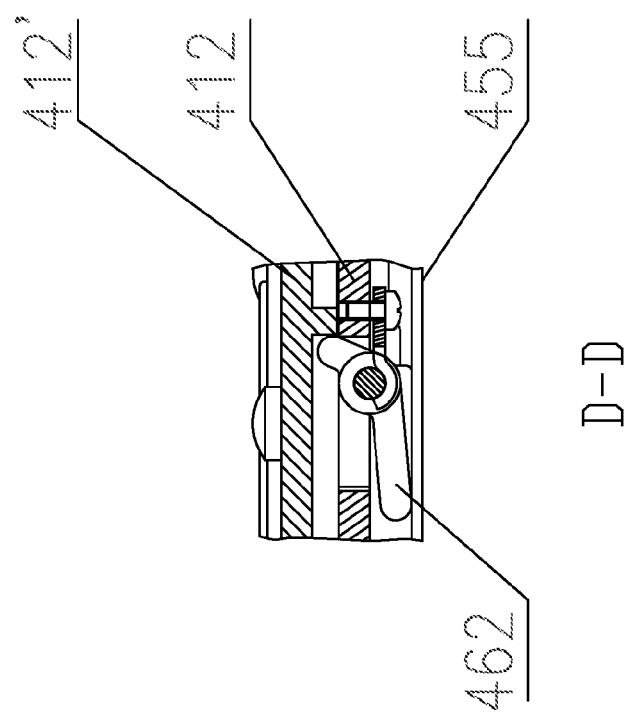
FIG. 25 is an enlarged side sectional view along line D-D of FIG. 21.
Figure 24:
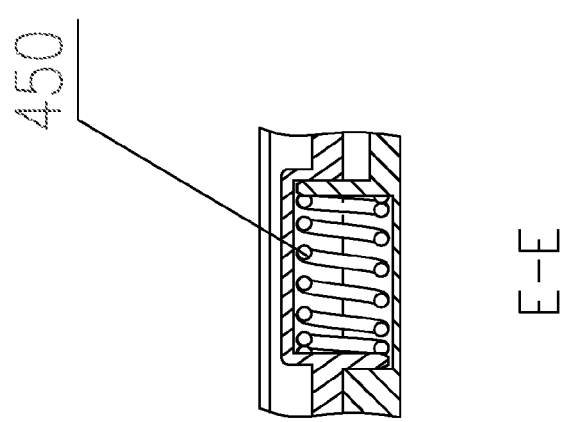
FIG. 24 is an enlarged side sectional view along line E-E of FIG. 21.

FIG. 19 is an exploded perspective view of a drive sprocket assembly in accordance with another embodiment of the invention. FIG. 20 is a front view of the sprocket assembly of FIG. 19 whereas FIG. 21 is a side sectional view along line B-B of FIG. 19 and FIG. 22 is a side sectional view along line C-C of FIG. 19. FIG. 23 is a rear view of the sprocket assembly of FIG. 19 whereas FIG. 24 is a side sectional view along line D-D of FIG. 23 and FIG. 25 is a side sectional view along line E-E of FIG. 23.

It will be understood by one skilled in the art from the following description of this embodiment that the novel features of this embodiment are not limited to only this embodiment, but are applicable to other embodiments described herein. Furthermore, the novel features of other embodiments are applicable to this embodiment of the invention.

The sprocket assembly 410 of this embodiment comprises first and second sprockets 412, 412'. The first sprocket 412 is fixed to the sprocket mounting member 438 and, in use, drives a chain drive for transferring drive from the first sprocket 412 to the rear wheel of the bicycle. The first sprocket 412 of this embodiment does not includes inwardly depending spines in contrast to the sprocket of the embodiment of FIGS. 1 to 9 and the sprocket mounting member 438 of this embodiment does not have a recessed rear surface. However, the sprocket 412 is fixed to the sprocket mounting member 438 to rotate therewith in like manner to the sprocket and sprocket mounting member of the embodiment of FIGS. 1 to 9 and thus functions in largely the same manner.

The second drive sprocket 412' is also affixed to the sprocket mounting member 438 for rotation therewith but on an opposite side to that of the first sprocket 412 as can best be seen in FIGS. 21 and 23. The second sprocket 412' is arranged to receive drive from a second chain drive (not shown). The second chain drive is driven by the motor unit (not shown) which in this embodiment is not mounted concentrically with the pedal spindle shaft but is mounted to another part of the frame of the bicycle. Consequently, this embodiment has two chain drives: a second chain drive for transferring drive from the motor unit to the second sprocket 412'; and a first chain drive for transferring drive from the first sprocket 412 to the rear wheel of the bicycle, where said drive is provided by a user manually operating the pedals and/or the motor unit through the second chain drive.

The sprocket assembly 410 includes an actuator ring member 455 of the type described with respect to the embodiment of FIGS. 1 to 9.

In this embodiment as in other embodiments, the first plate member 430 is configured to have a limited amount of rotational displacement relative to the first sprocket 412/sprocket mounting member 438 and means 462 for detecting this movement and means 4100, 4100' for converting the detected movement into a control input are provided in a like manner to other embodiments as can be seen in FIGS. 19 to 25. The levers 462 of the movement detecting means are mounted to the sprocket mounting member 438 using brackets 488

Figure 26:
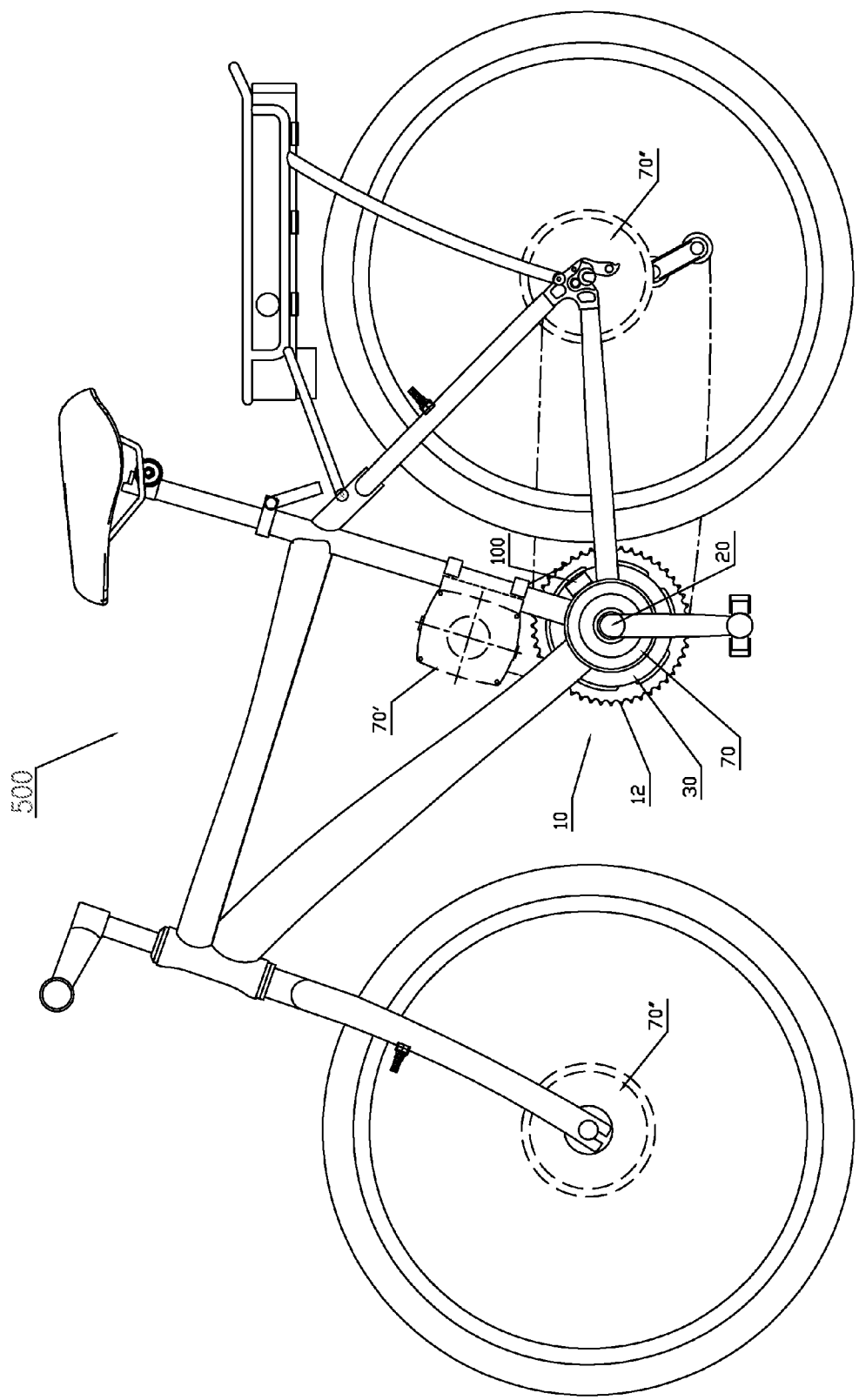
FIG. 26 is a schematic view of a pedal driven apparatus having a sprocket assembly, a control signal apparatus and a gear adjustment mechanism according to any of the embodiments of the invention.

FIG. 26 depicts a bicycle 500 having a sprocket assembly 10 with an associated means 100, 100' for detecting relative displacement of the plate member 30 with respect to the sprocket 12 according to any embodiments of the invention and a motor 70 with an associated power supply for assisting a cyclist in powering the bicycle in forward motion. By way of dotted lines in FIG. 10, some of a number of possible locations for the motor are illustrated. For example, the motor 70 may be mounted to engage one of the tyres or rims on the front or back wheel. Alternatively, the motor may be mounted such that it couples to a drive sprocket or axle of the rear wheel or an axle of the front wheel. Or, alternatively, it may be mounted in the novel manners disclosed herein in connection with some of the preferred embodiments whereby the motor rotor is mounted concentrically with the pedal spindle 20 or is remotely located from the pedal spindle and connected by a second chain drive or belt to a second sprocket.

FIGS. 27 to 30 depict another embodiment of the sprocket assembly according to the invention. In the following description like numerals as used in the description of FIGS. 1 to 9, the description of FIGS. 10 to 14, the description of FIGS. 15 to 17, the description of FIG. 18, the description of FIGS. 19 to 25 and/or the description of FIG. 26 preceded by an additional numeral "6" will be used to denote like parts with differences between the embodiments described for clarity.

This embodiment relates in general to a contactless means for converting a movement of a ring actuator member or push plate into a control signal for a component of the pedal driven apparatus such as a motor or a gear change mechanism. It will therefore be understood by one skilled in the art from the following description of this embodiment that the novel features of this embodiment are not limited to only this embodiment, but are applicable to other embodiments described herein. Furthermore, the novel features of other embodiments are applicable to this embodiment of the invention.

Figure 27:
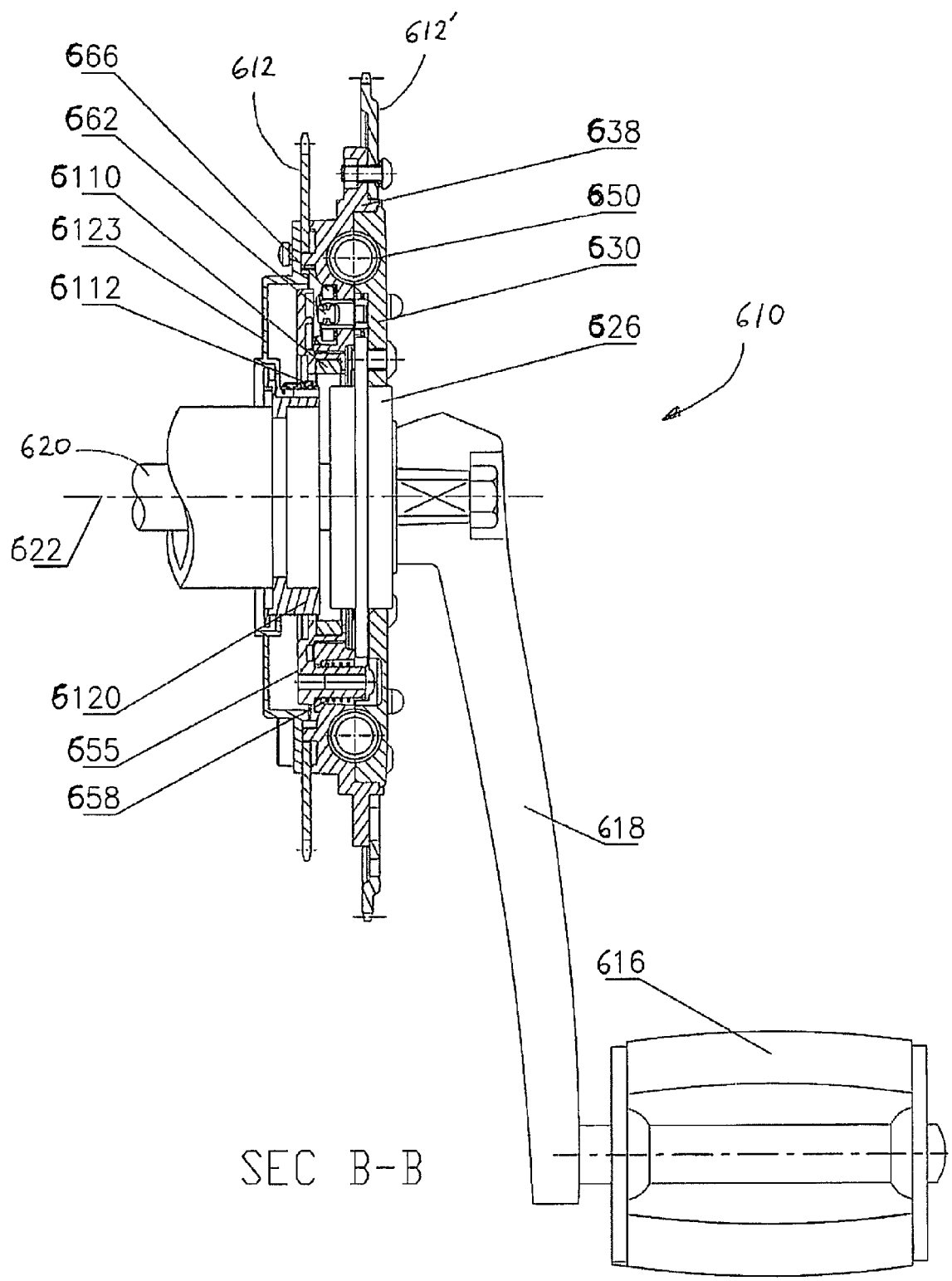
FIG. 27 is a side sectional view of a drive sprocket assembly in accordance with another embodiment of the invention along line B-B of FIG. 28.
Figure 28:
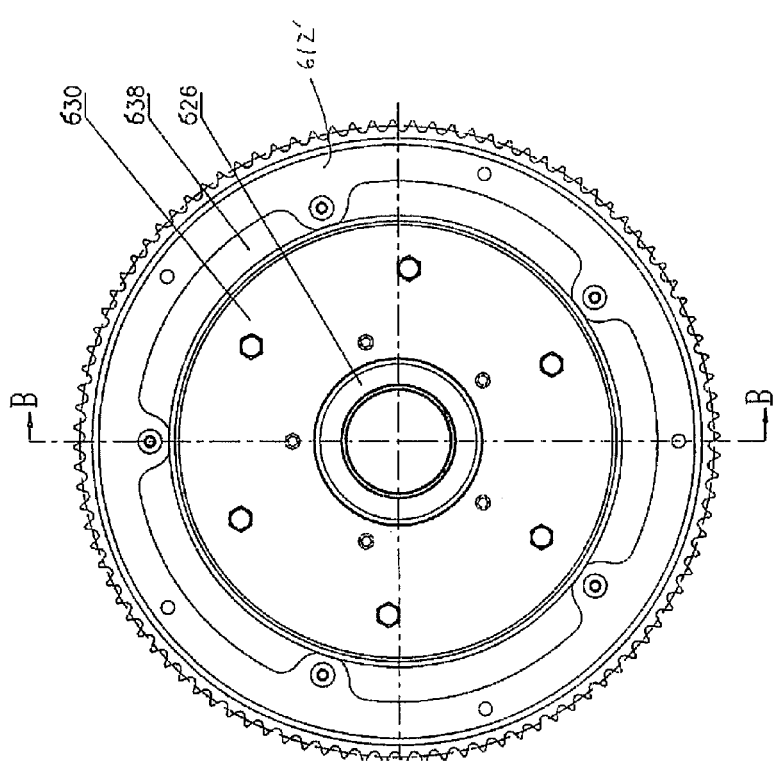
FIG. 28 is a front view of the sprocket assembly of FIG. 27.
Figure 29:
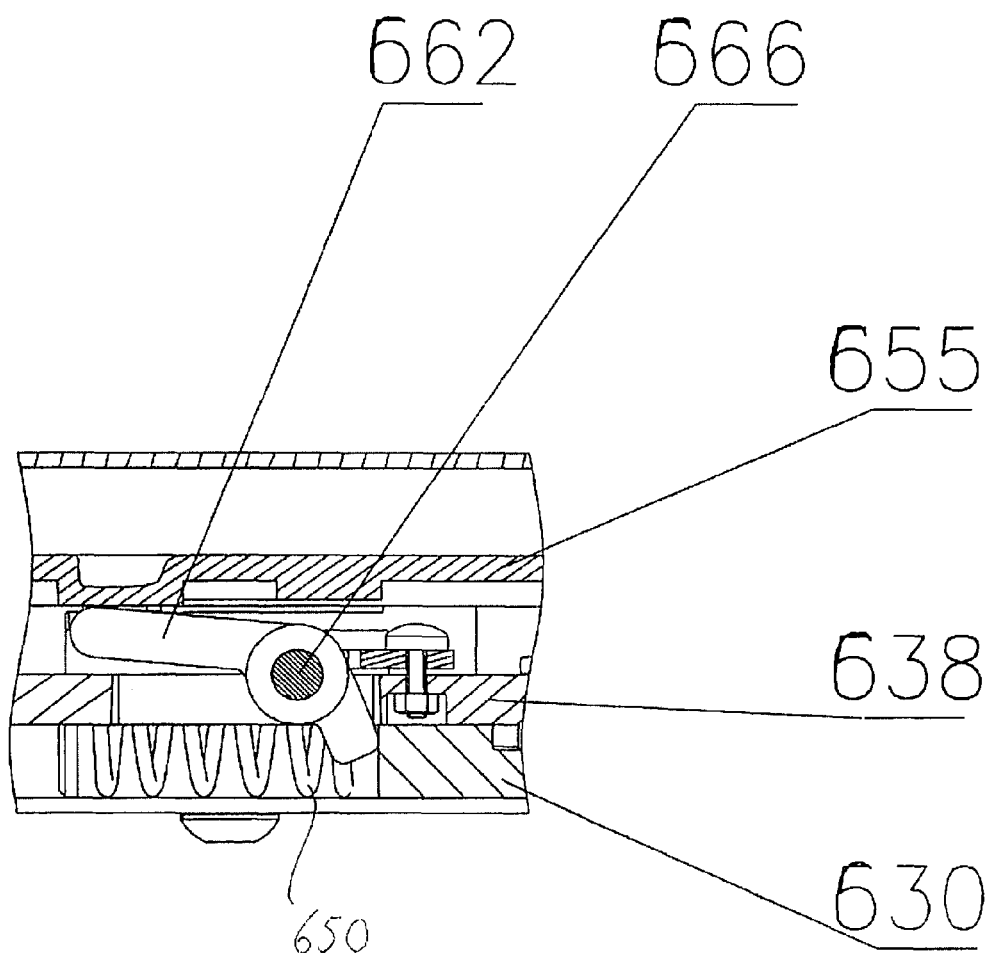
FIG. 29 is an enlarged partial sectional view of the plate member and sprocket mounting member of the sprocket assembly of FIGS. 27 and 28.
Figure 30:
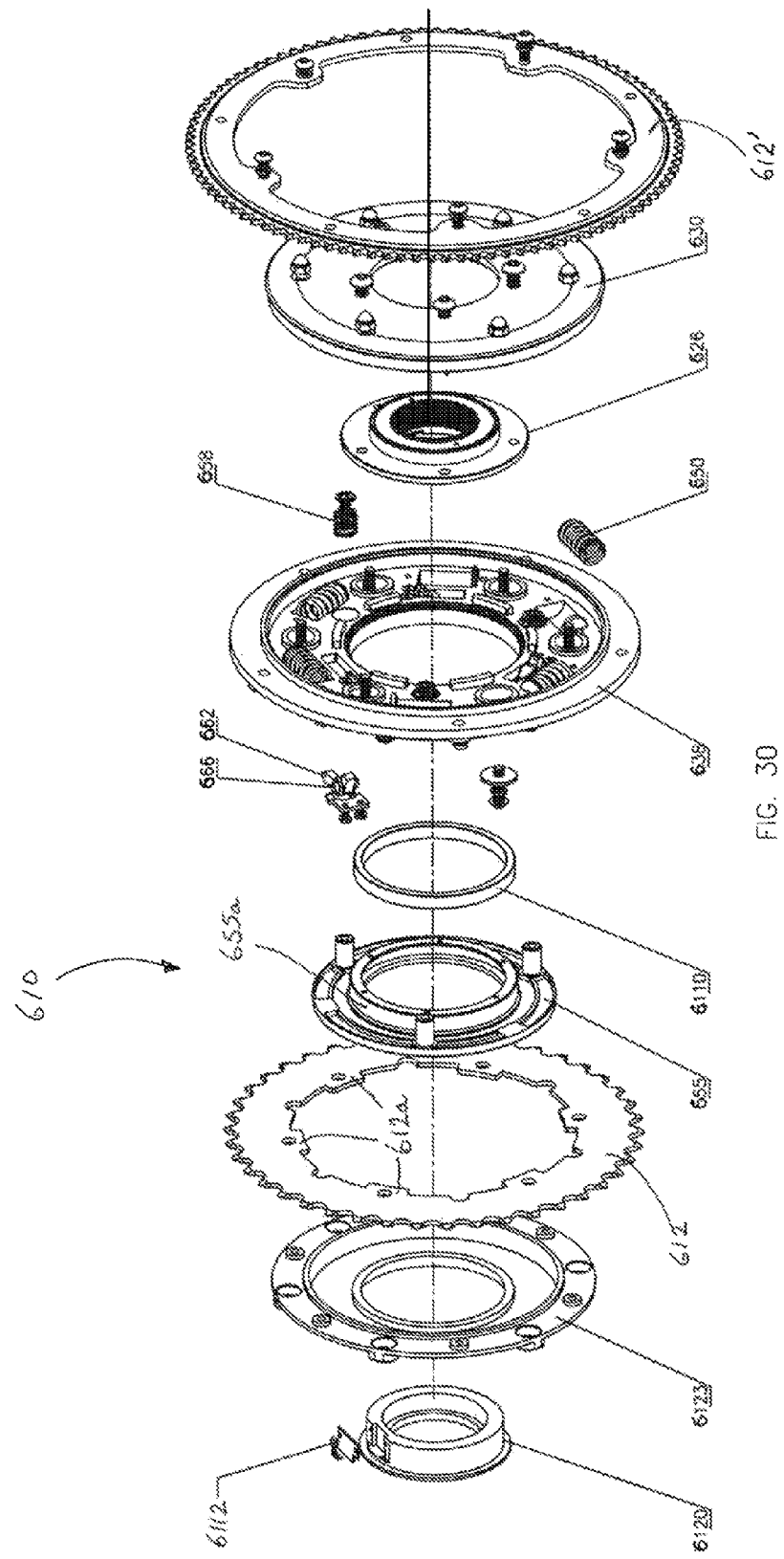
FIG. 30 is an exploded perspective view of the drive sprocket assembly of FIGS. 27 to 29.

FIG. 27 is a side sectional view of a drive sprocket assembly in accordance with another embodiment of the invention along line B-B of FIG. 28. FIG. 28 is a front view of the sprocket assembly of FIG. 27. FIG. 29 is an enlarged partial sectional view of the plate member and sprocket mounting member of the sprocket assembly of FIGS. 27 and 28. FIG. 30 is an exploded perspective view of the drive sprocket assembly of FIGS. 27 to 29.

The sprocket assembly 610 of this embodiment comprises first and second sprockets 612, 612'. The first sprocket 612 is fixed to the sprocket mounting member 638 and, in use, drives a chain drive (not shown) for transferring drive from the first sprocket 612 to, for example, a rear wheel of a bicycle in one arrangement, although it will be understood that the pedal driven apparatus may comprise other apparatuses other than bicycles. The first sprocket 612 of this embodiment includes inwardly depending spines 612a in common with the sprocket of the embodiment of FIGS. 1 to 9, although the inwardly depending splines 612a do not extend as far inwardly as in the sprocket of the embodiment of FIGS. 1 to 9. The sprocket 612 is fixed to the sprocket mounting member 638 to rotate therewith in like manner to the sprocket and sprocket mounting member of the embodiment of FIGS. 1 to 9 and other embodiments and thus functions in a similar manner.

The second drive sprocket 612' is also affixed to the sprocket mounting member 638 for rotation therewith but on an opposite side to that of the first sprocket 612 as can best be seen in FIG. 27. The second sprocket 612' is arranged to receive drive from a second chain drive (not shown). The second chain drive is driven by a motor unit (not shown) which in this embodiment, in contrast to some of the other embodiments, is not mounted concentrically with the pedal spindle shaft but is mounted to another part of the frame of the bicycle. Consequently, this embodiment has two chain drives: a second chain drive for transferring drive from the motor unit to the second sprocket 612'; and a first chain drive for transferring drive from the first sprocket 612 to the rear wheel of the bicycle, where said drive is provided by a user manually operating the pedals and/or the motor unit through the second chain drive.

The sprocket assembly 610 includes an actuator ring member or push plate 655 of a type similar, but not exactly the same, to that described with respect to the embodiment of FIGS. 1 to 9. One exception in this embodiment is that the actuator ring member 655 is configured to act in a contactless manner with respect to the means for converting a detected movement of the first plate member 630 into a control input as will be described in more detail below.

In this embodiment as in other embodiments, the first plate member 630 is configured to have a limited amount of rotational displacement relative to the first sprocket 612/sprocket mounting member 638 and means 662 for detecting this movement and means 6110, 6120, 6112 for converting the detected movement into a control input are provided. The levers 662 of the movement detecting means are mounted to the sprocket mounting member 638 using brackets 688 and pivot pins 666.

As in other embodiments, when a user applies manual pressure to at least a forward one of the pedals, the first plate member 630 is caused to be displaced rotationally with respect to the sprocket 612/sprocket mounting member 638 by an amount controlled by the biasing elements 650. This rotational displacement causes the levers 662 to be pivoted from their normal positions such that, as best seen in FIG. 29, distal ends of the levers 662 engage the actuator ring member or push plate 655 and cause it to move axially away from the sprocket 612/sprocket mounting member 638. The means 6110, 6120, 6112 for converting said detected axial movement of the push plate 655 comprise a contactless means, namely the push plate 655 does not physically contact said means 6110, 6120, 6112 in contrast to other embodiments of the invention where the actuator ring member/push plate does physically engage part of the converting means. In this embodiment, the means 6110, 6120, 6112 comprises a magnetized element 6110 carried on the push plate 655 and a sensor 6112 such as a Hall effect sensor mounted on a collar 6120 whereby movement of the actuator member 655 in said axial direction causes movement of the magnetized element 6110 relative to the sensor 6112. The sensor 6112 is mounted by means of a plate in a recess formed on a peripheral surface of the collar 6120. There could be more than one sensor, although only one sensor is illustrated in the figures depicting this embodiment. The collar 6120 is secured behind the sprocket assembly at a fixed axial position relative to the spindle 620. The magnetized element may be carried on a collar portion 655a of said actuator ring member 655. The magnetized element 6110 may be arranged on the push plate 655 such that, when the push plate moves axially away from the sprocket mounting member 638, the magnetized or magnetic element moves towards the sensor 6112. The magnetized element 6110 may comprise a ring shaped magnetic element or it may comprise a plurality of separate, but spaced apart magnetic elements carried on the push plate 655. Movement of the magnetic element 6110 relative to the sensor causes a variation in the magnetic field of the sensor which can be converted to a control input signal for another component such as the motor or gear change device of the pedal driven apparatus.

A further difference of this embodiment to other embodiments described herein is the provision of a protective cover 6123 behind the sprocket mounting plate 638 which functions to prevent the ingress of water, dirt an/or other contaminants into the sprocket assembly 610 and, more particularly, to the side of the sprocket assembly containing the push plate 655, movement detection means 662 and the means 6110, 6120, 6112 for converting a detected signal into a control input for another component of the pedal driven apparatus.

This embodiment has a number of advantages resulting from having a non-contact means for converting a movement of a ring actuator member or push plate into a control signal for a component of the pedal driven apparatus. One advantage is that the number of parts for implementing the converting means can be reduced. A further advantage is a reduction in wear through the avoidance of any contact between the push plate and any part of the converting means. A yet further advantage is that the non-contacting converting means can be made more sensitive than other embodiments where a physical engagement is required between the push plate and a part of the converting means.

In this and other embodiments, the plurality of biasing elements 650 which bias the sprocket mounting member 638 in its first position with respect to the first plate member 630 when no manual pressure is being applied to at least a forward one of the pedals 618 of the pedal driven apparatus, may be arranged such that at least one of said biasing elements 650 is configured to be engaged prior to others of said biasing elements when manual pressure is applied to a forward one of said pedals 618. Consequently, said at least one of said biasing elements 650 controls movement of the first plate member 630 with respect to the sprocket mounting member 638 for a first portion of possible travel of said first plate member 630 with respect to the sprocket mounting member 638. The plurality of biasing elements 650 may comprise a first set of biasing elements and a second set of biasing elements wherein said first set of biasing elements are configured to be engaged prior to the second set of biasing elements when manual pressure is applied to a forward one of said pedals. The first set of biasing elements thereby control movement of the first plate member 630 with respect to the sprocket mounting member 638 for a first portion of possible travel of the first plate member 630 with respect to the sprocket mounting member 638. The biasing elements, i.e. springs 650, of the first set may be longer and softer springs that those comprising said second set of biasing elements. An advantage of this arrangement is that the sprocket assembly is more responsive to a user applying manual pressure to the pedals 618 for an initial part of the possible rotational adjustment of the first plate member 630 with respect to the sprocket mounting member 638 than for a subsequent part of the possible rotational adjustment of the first plate member 630 with respect to the sprocket mounting member 638. Furthermore, the biasing element 650 could be arranged into three or more sets of biasing elements, each set being shorter and harder (higher spring modulus) than the preceding set whereby the responsiveness of the sprocket assembly to user pressure on the pedals becomes progressively less sensitive as the manual pressure applied by a user increases.

In general, the invention provides a hybrid bicycle which is manually propelled, but may include a motor unit for assisting forward propulsion of the bicycle. The bicycle has a control system for providing a control input for another component of the bicycle. Where that component comprises the motor, the control input is for increasing drive power applied by the motor unit to said bicycle. Where the component is a continuously variable transmission (CVT) for the bicycle, the control input is for continuously varying the gearing ratio of the CVT. Located adjacent a drive sprocket is a moveable plate member. The plate member and the drive sprocket are mounted for rotation about an axis of rotation of a pedal spindle, although the sprocket is not fixed for rotation with the pedal spindle. The drive sprocket is loosely coupled to the plate member with the plate member being moveable relative to the sprocket by a limited distance in a rotational direction. The plate member acts on a lever mechanism when it is moved relative to said drive sprocket such that any movement of the plate member results in an axial movement of an actuator member which triggers the control system to generate the control input in response to the amount of any movement of the plate member relative to the sprocket.

It can also be seen that the invention provides a control system for generating a control input for a component on a pedal driven apparatus. The control system comprises: a first member mounted for rotation about an axis of rotation of a pedal spindle; means for detecting movement of said first member relative to a drive sprocket in a rotational direction of said drive sprocket about said pedal spindle axis of rotation; and means for converting said detected movement to a control input for said another component on said pedal driven apparatus.

It can also be seen that the invention provides a drive sprocket assembly for a pedal driven apparatus, said drive sprocket assembly comprising: a first member rotatable about an axis of rotation of a pedal spindle; a drive sprocket rotatable about said axis of rotation of a pedal spindle, said drive sprocket being loosely coupled to said first member and moveable by a limited amount relative thereto in a rotational direction of said drive sprocket; and a mechanism for detecting movement of said first member relative to said drive sprocket in said rotational direction of said drive sprocket.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art, in Australia or any other country.

The invention claimed is:

1. A pedal driven apparatus comprising:
   a first member mounted for rotation about an axis of rotation of a pedal spindle;
   a drive sprocket mounted for rotation about said axis of rotation of a pedal spindle;

means for detecting movement of said first member relative to said drive sprocket in a rotational direction of said drive sprocket about said pedal spindle axis of rotation; and means for converting said detected movement to a control input for another component on said pedal driven apparatus.

2. The pedal driven apparatus of claim 1, wherein said control input comprises any of an electrical control input, an electronic control input or a mechanical control input.

3. The pedal driven apparatus of claim 1, wherein said means for detecting movement comprises a mechanism associated with a drive sprocket assembly of said pedal driven apparatus.

4. The pedal driven apparatus of claim 3, wherein the means for detecting movement is configured to translate a detected rotational movement into an axial movement.

5. The pedal driven apparatus of claim 3, wherein said first member is mounted for fixed rotation with the pedal spindle of said pedal driven apparatus and the drive sprocket is mounted on a second member which is mounted for rotation about the pedal spindle axis of rotation, but is not fixed for rotation with the pedal spindle and which is coupled to the first member and moveable by a limited amount relative to the first member between a first position and a second position.

6. The pedal driven apparatus of claim 5, wherein the second member is coupled to the first member such that a manual driving force applied to pedals of the pedal driven apparatus is transferred by said first member to said second member.

7. The pedal driven apparatus of claim 6, wherein at least one biasing element biases said second member in its first position with respect to the first member when no manual pressure is being applied to at least a forward one of the pedals.

8. The pedal driven apparatus of claim 5, wherein the means for detecting movement comprises at least one lever member pivotally mounted on the second member so as to pivot about an axis that is perpendicular to the pedal spindle axis of rotation and which comprises a first end which engages a surface of the first member such that, when the first member moves relative to the second member, the first member causes the at least one lever member to pivot about its pivot axis whereby a second end of said lever member extends outwardly from the second member in a direction parallel to the pedal spindle axis of rotation to engage an actuator member and cause said actuator member to move in an axial direction perpendicular to said rotational directional.

9. The pedal driven apparatus of claim 1, wherein said means for converting said detected movement is configured to receive movement of an actuator member in an axial direction perpendicular to said rotational directional of the sprocket.

10. The pedal driven apparatus of claim 9, wherein said means for converting said detected movement comprises a rack and pinion assembly whereby the rack is biased to press against the actuator member such that movement of the actuator member in said axial direction causes movement of said rack and thus rotation of the pinion.

11. The pedal driven apparatus of claim 10, wherein the rack and pinion assembly has a sensor associated therewith which senses rotation of the pinion and outputs a signal indicative of an amount by which the pinion has been caused to rotate by the actuator member acting on the rack.

12. A pedal driven apparatus comprising:
a first member mounted for fixed rotation with a pedal spindle, about an axis of rotation of said pedal spindle;
a drive sprocket mounted on a second member, said second member mounted for rotation about the pedal spindle axis of rotation, but not fixed for rotation with said pedal spindle, said second member coupled to the first member and moveable by a limited amount relative to the first member between a first position and a second position, and said second member coupled to the first member such that a manual driving force applied to pedals of the pedal driven apparatus is transferred by said first member to said second member;
means for detecting movement of said first member relative to said drive sprocket in a rotational direction of said drive sprocket about said pedal spindle axis of rotation, wherein said means for detecting includes a mechanism associated with a drive sprocket assembly of said pedal driven apparatus, and said means for detecting is configured to translate a detected rotational movement into an axial movement;
means for converting said detected movement to a control input for another component on said pedal driven apparatus, said control input selected from the group consisting of an electrical control input, an electronic control input or a mechanical control input; and
a plurality of biasing elements biasing said second member in its first position with respect to the first member when no manual pressure is being applied to at least a forward one of the pedals, wherein at least one of said biasing elements is configured to be engaged prior to others of said biasing elements when manual pressure is applied to a forward one of said pedals whereby said at least one of said biasing elements controls movement of the first member with respect to the second member for a first portion of possible travel of said first member with respect to the second member.

13. The pedal driven apparatus of claim 12, wherein the plurality of biasing elements comprise a first set of biasing elements and a second set of biasing elements and wherein said first set of biasing elements are configured to be engaged prior to the second set of biasing elements when manual pressure is applied to a forward one of said pedals whereby said first set of biasing elements controls movement of the first member with respect to the second member for a first portion of possible travel of said first member with respect to the second member.

14. A pedal driven apparatus comprising:
a first member mounted for rotation about an axis of rotation of a pedal spindle;
a drive sprocket mounted for rotation about said axis of rotation of a pedal spindle;
means for detecting movement of said first member relative to said drive sprocket in a rotational direction of said drive sprocket about said pedal spindle axis of rotation; and
means for converting said detected movement to a control input for another component on said pedal driven apparatus, wherein said means for converting said detected movement is configured to receive movement of an actuator member in an axial direction perpendicular to said rotational direction of the sprocket and comprises a contactless means whereby movement of the actuator member in said axial direction causes movement of a magnetized element relative to a magnetic sensor.

15. The pedal driven apparatus of claim 14, wherein said means for converting said detected movement comprises the magnetized element being carried on said actuator member and the magnetic sensor carried on a collar having a fixed axial position with respect to the spindle.

16. The pedal driven apparatus of claim 1, wherein said another component comprises a motor mounted on said pedal driven apparatus and wherein said pedal driven apparatus includes a controller for receiving a control input from said converting means for increasing an amount of driving force applied by said motor to said pedal driven apparatus to propel said pedal driven apparatus.

17. A control system for generating a control input for a component on a pedal driven apparatus, said control system comprising:
- a first member mounted for rotation about an axis of rotation of a pedal spindle;
- means for detecting movement of said first member relative to a drive sprocket in a rotational direction of said drive sprocket about said pedal spindle axis of rotation; and
- means for converting said detected movement to a control input for said another component on said pedal driven apparatus.

18. The pedal driven apparatus of claim 1, wherein said another component comprises a gearing adjustment means for said pedal driven apparatus and wherein said gearing adjustment means is configured to receive a control input from said converting means for causing said gearing adjustment means to effect a gearing change for the pedal driven apparatus.

19. The pedal driven apparatus of claim 18, wherein the pedal driven apparatus comprises a bicycle and the gearing adjustment means is associated with a rear wheel of the bicycle and is configured to receive the control input from the converting means to thereby effect a change in a gearing ratio applied to the rear wheel.

20. The pedal driven apparatus of claim 19, wherein the gearing adjustment means comprises a continuous variable transmission (CVT) system having a continuously variable gearing ratio, said CVT system being configured to receive said input control signal and adjust the gearing ratio by an amount proportional to the movement detected by the movement detecting means.

21. The pedal driven apparatus of claim 20, wherein the CVT system has a servo-motor associated therewith which is configured to receive said input control signal whereby operation of the servo-motor in response to the input control signal effects a continuously variable change in the gearing ratio through movement of a control pin of the CVT system.

22. A drive sprocket assembly for a pedal driven apparatus, said drive sprocket assembly comprising:
- a first member rotatable about an axis of rotation of a pedal spindle;
- a drive sprocket rotatable about said axis of rotation of a pedal spindle, said drive sprocket being loosely coupled to said first member and moveable by a limited amount relative thereto in a rotational direction of said drive sprocket; and
- a mechanism for detecting movement of said first member relative to said drive sprocket in said rotational direction of said drive sprocket.

* * * * *